United States Patent
Hara

(10) Patent No.: US 7,408,288 B2
(45) Date of Patent: Aug. 5, 2008

(54) DRIVING APPARATUS

(75) Inventor: Yoshihiro Hara, Kishiwada (JP)

(73) Assignee: Konica Minolta Holdings, Inc., Tokyo (JP)

(*) Notice: Subject to any disclaimer, the term of this patent is extended or adjusted under 35 U.S.C. 154(b) by 0 days.

(21) Appl. No.: 11/246,737

(22) Filed: Oct. 7, 2005

(65) Prior Publication Data

US 2006/0082253 A1    Apr. 20, 2006

(30) Foreign Application Priority Data

Oct. 15, 2004    (JP) .............................. 2004-301519

(51) Int. Cl.
*H01L 41/09*    (2006.01)

(52) U.S. Cl. .................. 310/323.01; 310/317

(58) Field of Classification Search ............ 310/323.17, 310/316.01–316.03, 317, 323.01–323.16, 310/323.18–323.21; 396/134

See application file for complete search history.

(56) References Cited

U.S. PATENT DOCUMENTS

| | | | | |
|---|---|---|---|---|
| 6,433,459 | B1* | 8/2002 | Okada | 310/317 |
| 6,657,362 | B2* | 12/2003 | Matsuo et al. | 310/323.02 |
| 6,727,635 | B2* | 4/2004 | Okamoto et al. | 310/316.01 |
| 6,954,023 | B2 | 10/2005 | Hata et al. | 310/328 |
| 2002/0180387 | A1* | 12/2002 | Kataoka | 318/114 |
| 2003/0198150 | A1* | 10/2003 | Okada et al. | 369/44.28 |
| 2004/0013420 | A1* | 1/2004 | Hara | 396/55 |

FOREIGN PATENT DOCUMENTS

| | | |
|---|---|---|
| JP | 10-150786 A | 6/1998 |
| JP | 11-206156 A | 7/1999 |
| JP | 11-225488 A | 8/1999 |
| JP | 2000-156986 A | 6/2000 |
| JP | 2000-245177 A | 9/2000 |
| JP | 2004-15864 A | 1/2004 |

OTHER PUBLICATIONS

Japanese "Notification of Reasons for Refusal", dated Feb. 28, 2007, for counterpart Japanese Patent Application No. 2004-301519; along with an English-language partial translation thereof.
Japanese "Examiner's Decision of Refusal", dated Jan. 24, 2008, for counterpart Japanese Patent Application No. 2004-301519; along with an English-language translation thereof.

* cited by examiner

*Primary Examiner*—Darren Schuberg
*Assistant Examiner*—Derek J Rosenau
(74) *Attorney, Agent, or Firm*—Sidley Austin LLP

(57) ABSTRACT

A determination is made whether a moving speed of a slider section with respect to a rod section in a piezoelectric actuator is lower than a predetermined speed. When the moving speed is lower than the predetermined speed, it is considered that a friction-bonded portion between the rod section and the slider section is in a fastened state or a nearly fastened state. A resonance frequency of the piezoelectric actuator or a frequency proximity to the resonance frequency is set as a driving frequency for the piezoelectric actuator. The slider section is moved in a reciprocating manner plural times with respect to the rod section. As a result, an abnormal state is eliminated from the piezoelectric actuator.

57 Claims, 11 Drawing Sheets normal direction opposite direction

DRIVING APPARATUS

The present application claims priority to Japanese Patent Application No. 2004-301519 filed in Oct. 15, 2004, the entire content of which is hereby incorporated by reference.

BACKGROUND OF THE INVENTION

1. Field of the Invention

The present invention relates to a driving apparatus using an electromechanical transducer such as a piezoelectric element.

2. Description of the Related Art

Conventionally, impact driving system actuators (impact actuators), which are constituted so that a mobile object such as slider is friction-bonded to a rod-type driving member (driving shaft) so as to be mounted thereto and an electromechanical transducer such as a piezoelectric element is fastened to one end of the driving shaft, are known. For example, in a piezoelectric actuator disclosed in U.S. Pat. No. 6,433,459, a predetermined driving voltage is applied to a piezoelectric element so that the piezoelectric element and a driving shaft are displaced into a saw-tooth wave. As a result, a mobile object is moved along the driving shaft in a dynamical friction state by its inertia according to a time difference between extension and contraction of the piezoelectric element.

When the impact actuator is driven, friction (sliding) is generated between the mobile object and the driving shaft at frequency of, for example, several dozens kHz, and thus frictional heat is generated. Since it is required that the driving shaft is made of a light material with high hardness, the driving shaft is composed of fiber-reinforced resin which is reinforced by carbon whisker or the like. When, however, the actuator is driven for a long time in a high-temperature state (under generation of frictional heat), a resin component in the driving shaft occasionally dissolves. When the actuator is stopped in this state and is left unattended, the dissolved resin component is cooled to be hardened, and the friction-bonded portion between the mobile object and the driving shaft is brought into a fastened state or in a nearly fastened state. As a result, the frictional force becomes stronger than frictional force at the time of the normal driving (standard state). In the impact actuator, the frictional force due to the friction-bonding changes according to environmental conditions such as temperature (the frictional heat and the like) (including another conditions such as a difference in posture, a difference in driving posture, deterioration with age and the like). Further, in the impact actuator, when the driving voltage (driving signal) is applied, not only the frictional force but also a force which is generated by the actuator changes according to the environmental conditions.

For example, when the mobile object and the driving shaft are brought into the fastened state or the nearly fastened state as described above, under the environmental condition such that the force generated by the actuator becomes comparatively weak (for example, in a low-temperature state), a necessary operating speed cannot be obtained and thus the driving becomes unstable at the time of next driving (actuating), namely, the actuator is brought into an operation defective state. Further, not only under the environmental condition such that the actuator is in the operation defective state, but also under the environmental condition at the time of normal driving, the actuator is brought into an operation disabled state such that it is not driven at all.

SUMMARY OF THE INVENTION

It is a main object of the present invention to provide a driving apparatus that is capable of improving an operating defective state of an impact actuator or eliminating an operation disabled state easily and securely.

In order to achieve this and another objects, from a certain aspect of the present invention, a driving apparatus includes an actuator that includes an electro-mechanical transducer, a driving member which is fastened to the electro-mechanical transducer and displaces together with the transducer, and a driven member which is friction-bonded to the driving member, and are driven at a predetermined driving frequency; a speed determining unit that determines whether a moving speed of the driven member with respect to the driving member is lower than a predetermined speed; a frequency setting unit that, when the speed determining unit determines that the moving speed is lower than the predetermined speed, sets a frequency which can make the actuator generate a resonance phenomenon as the driving frequency for the actuator; and a driving unit that drives the actuator using a driving signal with the frequency set in the driving frequency setting unit.

The electro-mechanical transducer converts an electrical energy such as a voltage, an electric current, an electric field, a magnetic field or a static electricity into a mechanical energy such as expansion and contraction, bending, twist or distortion. In general, a piezoelectric element, an electrostrictor, a magnetostrictor, an electrostatic actuator and the like are known.

Further, from another aspect of the present invention, a driving apparatus includes: an actuator that includes a piezoelectric element section, a rod section whose one end is fastened to the piezoelectric element and which is displaced together with a transducer, and a slider section which is friction-bonded to the rod section and can move along the rod, and is driven at a predetermined driving frequency; and a driving signal generating circuit that determines whether a moving speed of a driven member with respect to the driving member is lower than a predetermined speed, and when the determination is made that the moving speed is lower than the predetermined speed, sets a frequency which can make the actuator generate a resonance phenomenon as the driving frequency for the actuator, so as to drive the actuator using a driving signal with the set frequency.

The invention itself, together with further objects and attendant advantages, will best be understood by reference to the following detailed description taken in conjunction with the accompanying drawings.

BRIEF DESCRIPTION OF THE DRAWINGS

FIG. 4A is a diagram explaining the case where normal direction driving is carried out, and FIG. 4B is a diagram explaining the case where opposite direction driving is carried out;

In the following description, like parts are designated by like reference numbers throughout the several drawing.

DETAILED DESCRIPTION OF THE PREFERRED EMBODIMENTS

Embodiments of the present invention are explained below with reference to the drawings.

Figure 1:
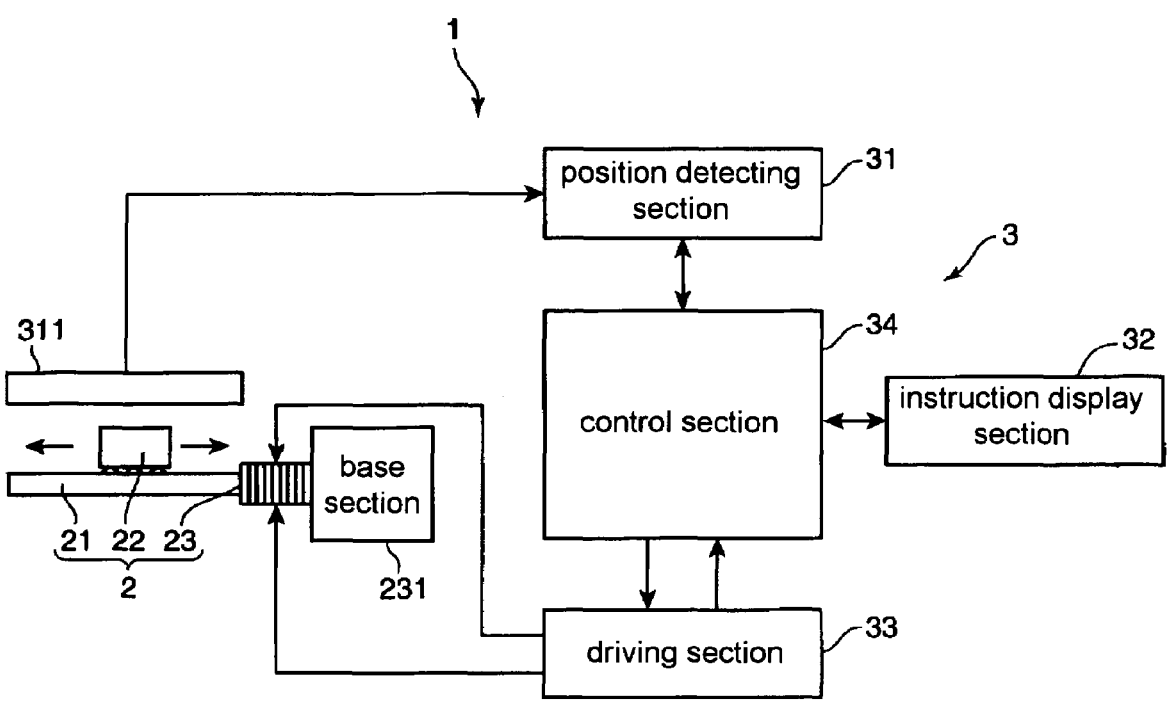
FIG. 1 is a block diagram illustrating one constitutional example of a piezoelectric driving apparatus according to the present invention.

FIG. 1 is a block diagram illustrating one constitutional example of a piezoelectric driving apparatus according to the present invention. As shown in FIG. 1, the piezoelectric driving apparatus 1 is composed of a piezoelectric actuator 2 and a driving signal generating circuit 3. The piezoelectric actuator 2 is an impact actuator (linear actuator) where so-called ultrasonic driving is carried out. The piezoelectric actuator 2 has a rod section 21, a slider section 22, a piezoelectric element section 23 and the like.

The rod section 21 is a bar-shaped driving member (driving shaft) having a predetermined sectional shape that is driven (vibrated) by the piezoelectric element section 23, and supports a movement of the slider section 22. The slider section 22 is friction-bonded, namely, engaged with the rod section 21 by predetermined frictional force, and is a driven member (mobile object) that slides along an axial direction of the rod section 21 (a right-left direction shown by an arrow in FIG. 1) according to driving of the rod section 21. The slider section 22 is provided integrally with an LED (infrared LED) or the like that detects a position of the slider section 22.

The piezoelectric element section 23 expands and contracts according to a voltage to be applied, and vibrates the rod section 21 according to the expansion and contraction. In the expansion and contraction of the piezoelectric element section 23, high-speed expansion and low-speed contraction, the low-speed expansion and high-speed contraction, or equal-speed expansion and contraction where the speeds of expansion and contraction are equal with each other are repeated alternately. The piezoelectric element section 23 is composed of, for example, a laminated type piezoelectric element, and it is fastened to one end of the rod section 21 with a polarization direction matching with the axial direction of the rod section 21. A signal line from a driving section 33, mentioned later, is connected to an electrode section of the piezoelectric element section 23, and the piezoelectric element section 23 is charged or discharged (opposite-direction charging) according to a driving signal (driving voltage) from the driving section 33 so that the piezoelectric element section 23 expands and contracts. When such expansion and contraction of the piezoelectric element section 23 are repeated, the slider section 22 moves relatively in a normal direction or an opposite direction with respect to the rod section 21 (the right direction or the left direction in FIG. 1), or is suspended. The end of the rod section 21 opposite to the piezoelectric element section 23 is fixed to a base section 231 including a deadweight (weight) or the like so that the vibration generated by the piezoelectric element section 23 is transmitted efficiently to the rod section 21.

The driving signal generating circuit 3 generates a driving signal for the piezoelectric actuator 2, concretely, generates a PWM (Pulse Width Modulation) signal for driving according to, for example, a PWM driving system, and generates a driving voltage based on the PWM signal so as to output it to the piezoelectric actuator 2. The driving signal generating circuit 3 is composed of a position detecting section 31, an instruction display section 32, a driving section 33, a control section 34 and the like.

The position detecting section 31 has a position detecting element section 311, and is a detecting circuit that detects a position of the slider section 22 on the rod section 21 based on the detected signal from the position detecting element section 311. The position detecting section 31 inputs the detected signal from the position detecting element section 311, and outputs position information (position detected signal) representing a current position of the slider section 22 according to the input signal to the control section 34. The position detecting element section 311 has a position detecting element such as PSD (Position Sensitive Device), and receives infrared light from the LED moving integrally with the slider section 22 by means of the PSD so as to output a detected signal according to the position of the slider section 22 to the position detecting section 31.

The instruction display section 32 inputs a predetermined instruction according to a user's operation, and displays predetermined information. The instruction display section 32 is provided with operation switches including an actuating switch (power source switch) for actuating the piezoelectric driving apparatus 1 and the other switches for setting (inputting) device operations, and a monitor section such as LCD on which information such as guides and messages for operating the devices is displayed (buttons or the like for inputting instructions are also displayed) Result information (message sentence) after driving system operations are checked, such as "driving system is defective" and "position sensor is defective", mentioned later, is displayed on the monitor section. The result information does not have to be displayed as a message sentence, and may be displayed by a method, for example, of blinking a predetermined warning lamp (or blinking display on the monitor section).

The driving section 33 is a driving circuit that outputs a driving signal to the piezoelectric actuator 2 based on the driving instruction signal from the control section 34, and charges or discharges the piezoelectric element section 23 so as to drive the piezoelectric actuator 2. The driving section 33 counts a clock pulse to be output from an oscillation element of the control section 34, and generates a PWM signal (PWM1 signal) based on a compared result or the like, which is obtained by comparing set values relating to a period for a driving pulse (PWM signal) set (stored) in a register or the like in the driving section 33 (this periods corresponds to a period of a driving signal, mentioned later, to be output from the driving section 33 to the piezoelectric actuator 2, namely, a driving frequency) and a duty ratio with the counted value using a comparator. At the same time, the driving section 33 generates a PWM2 signal which is obtained by inverting the PWM1 signal (high: H and low: L in the PWM1 signal) using an inverter. A driving voltage (driving signal) for charging and discharging the piezoelectric element section 23 is output by a driver for driving the piezoelectric actuator 2 based on the generated PWM1 signal and PWM2 signal. The driver in the driving section 23 is composed of a bridge circuit composed of, for example, a predetermined number of switch elements (for example, N-channel or P-channel FET). The driver alternately generates a positive driving voltage (+Vp) for charging the piezoelectric element section 23 and a negative driving voltage (−Vp) for discharging the piezoelectric element section 23 (opposite-direction charging), and outputs a driving signal (rectangular wave) composed of the driving voltages +Vp and −Vp to the piezoelectric actuator 2. The period and the duty ratio are set to the register or the like in the driving section 33 based on a setting instruction from the control section 34.

The control section 34 controls an entire operation of the piezoelectric driving apparatus 1. The control section 34 is composed of a ROM (Read Only Memory) that stores respective control programs, a RAM (Random Access Memory) that tentatively stores data, and a CPU and like that read the control programs and the like from the ROM and execute them. The control section 34 makes various calculations based on various signals from the position detecting section 31, the instruction display section 32, the driving section 33 and the like, and outputs operation instructing signals for the respective sections. For example, the control section 34 outputs a driving instruction signal including setting information and the like for driving the piezoelectric actuator 2 such as the driving frequency (period) and the duty ratio to the driving section 33, and allows the driving section 33 to generate the PWM signal and the driving signal for driving the piezoelectric actuator 2 in accordance with the driving mode (for example, the driving system operation check mode, mentioned later). The control section 34 has an oscillation element (not shown) such as crystal oscillator as a clock generating section for generating a clock signal that has a predetermined frequency, and outputs a clock signal to the driving section 33 and the like.

Figure 2:
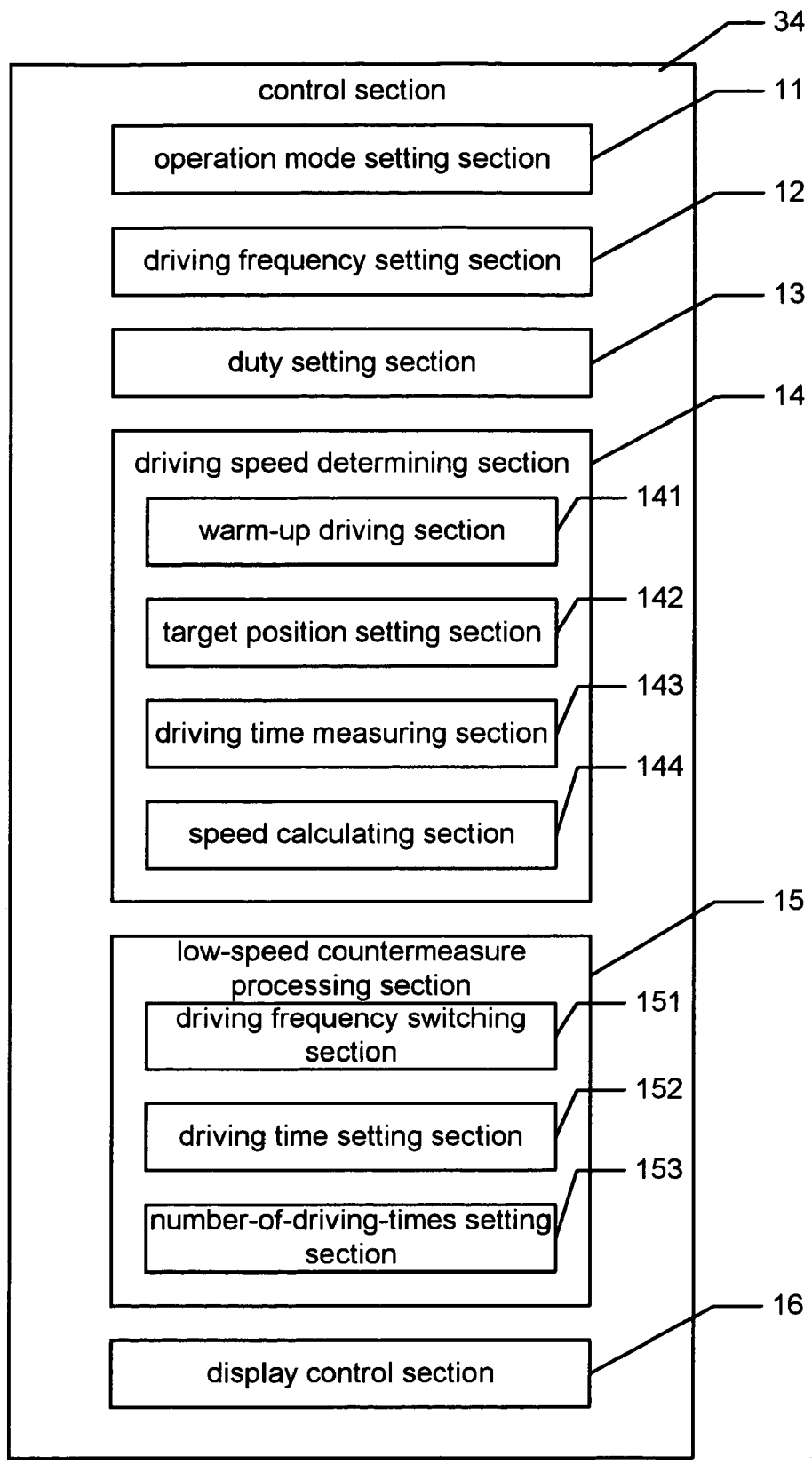
FIG. 2 is a block diagram illustrating one constitutional example of a control section.

FIG. 2 is a block diagram illustrating one constitutional example of the control section 34. As shown in FIG. 2, the control section 34 has an operation mode setting section 11, a driving frequency setting section 12, a duty setting section 13, a driving speed determining section 14, a low-speed countermeasure processing section 15 and a display control section 16. The operation mode setting section 11 sets various operation modes, such as a driving system operation check mode for checking operations of the driving systems such as the piezoelectric actuator 2 and the position detecting section 31 at the time of actuation, and a standby mode for bringing the driving systems into a driving standby state after they are checked. An operation mode such that a standby mode is set without checking the operations of the driving systems may be set at the time of actuation.

The driving frequency setting section 12 sets the driving frequency (period) of the piezoelectric actuator 2. A driving frequency (f2) as a default value to be used for actuation, for example, is set in the driving frequency setting section 12. A driving frequency according to a switching instruction by means of a driving frequency switching section 151, mentioned later, in the driving system operation check mode (a complete resonance frequency or a proximity resonance frequency, mentioned later) is set. Information about the various driving frequencies which are instructed to be switched may be stored in the driving frequency setting section 12.

The duty setting section 13 sets a duty ratio (Dt) of the piezoelectric actuator 2. Information about the duty ratio as a so-called default to be used in ordinary driving such as a duty ratio 3:7 (Dt=0.3) for the normal direction driving and a duty ratio 7:3 (Dt=0.7) for the opposite direction driving is set in the duty setting section 13. Also duty ratio information other than the default values is set in the duty setting section 13.

The driving speed determining section 14 detects a driving speed of the piezoelectric actuator 2, namely, a moving speed of the slider section 22 with respect to the rod section 21 when the piezoelectric actuator 2 is driven in the driving system operation check mode, and also makes a so-called driving speed check for determining whether the moving speed is normal (moving speed in the ordinary operating state). The determination is made whether the moving speed is normal in the following manner. Information about a certain speed range corresponding to a range of the moving speed obtained in the ordinary driving is previously set in the driving speed determining section 14, and the moving speed of the slider section 22 which is calculated based on the position information or the like of the slider section 22 by means of the position detecting section 31 is compared with the speed range, so that the determination is made whether the moving speed is within the speed range. The moving speed is compared with the speed range concretely by determining whether the moving speed is lower than a minimum speed Vmin in the speed range.

The driving speed determining section 14 detects that the slider section 22 is in an operation disabled state where it cannot move due to the fastened state or the like between the slider section 22 and the rod section 21 at the time of the driving speed check (for example, when warm-up driving is tried). Concretely, the driving speed determining section 14 determines whether a predetermined time passes after the movement (driving) of the slider section 22 is instructed to be started, when determining that the predetermined time passes, it outputs a driving disability detecting signal to the low-speed countermeasure processing section 15.

Further, the driving speed determining section 14 determines whether the moving speed of the slider section 22 is higher than a maximum speed Vmax in the speed range, so as to be capable of determining also whether the position detecting section 31 (position detecting system) that detects the position of the slider section 22 is defective (mis-operates). The determination that the moving speed is higher than the maximum speed Vmax means that a value which is larger than a value of the maximum moving speed at which the driving is actually possible is detected, and the slider section 22 does not actually move at that moving speed, but as a result the determination is made that the position detecting system that detects the position of the slider section 22 to be used for detecting the moving speed of the slider section 22 is defective.

The driving speed determining section 14 has a warm-up driving section 141, a target position setting section 142, a driving time measuring section 143, a speed calculating section 144 and the like. The warm-up driving section 141 carries out predetermined warm-up driving when the driving speed check operation of the piezoelectric actuator 2 is started. The warm-up driving is such that the slider section 22 is moved from a predetermined position with respect to the rod section 21 (for example, a center position, mentioned later) to a normal direction or an opposite direction (negative direction) by a predetermined distance (for example, ±0.5 mm) alternately. Moving distance information about the slider section 22 in the warm-up driving (for example, position information such as ±0.5 mm) may be set in the warm-up driving section 141. The warm-up driving section 141 sets (moves) the slider section 22 to the predetermined center position with respect to the rod section 21 (this center position is not always a right-left center position of the rod section 21, and it shows a preset movement starting position).

The target position setting section 142 sets a target position as moving destination at the time of moving the slider section 22, and sets, for example, 0.5 mm to the normal direction (+0.5 mm) and 0.5 mm to the opposite direction (−0.5 mm) with the center position being a standard point. The driving time measuring section 143 measures the driving time (moving time) for which the slider section 22 starts from a current position to the target position. The driving time measuring section 143 determines whether the slider section 22 in the movement starting position reaches the target position, and when the slider section 22 reaches the target position, it stops the driving. The speed calculating section 144 calculates a moving speed (driving speed) from a certain position of the slider section 22 on the rod section 21 (movement starting point) to a certain position (movement end point) based on information about the driving time and the moving distance of the slider section 22 based on the target position. The speed calculating section 144 can further calculate an average speed of calculated plural moving speeds.

When the moving speed of the slider section 22 is lower than the minimum speed Vmin in the speed range, namely, in a low-speed state (including the case where the moving speed becomes 0) in the driving speed determining section 14, the low-speed countermeasure processing section 15 performs a return operation so that the driving at the moving speed in the speed range (driving in the normal state) is enabled. In other words, when the piezoelectric actuator 2 is in the operation defective state (for example, the rod section 21 and the slider section 22 are in a nearly fastened state) or in the operation disabled state (for example, the rod section 21 and the slider section 22 are in the fastened state) due to an environmental condition or the like, the low-speed countermeasure processing section 15 executes a process for eliminating an abnormal state (low-speed countermeasure process). Concretely, the low-speed countermeasure processing section 15 sets a frequency at which a resonance phenomenon occurs in the piezoelectric actuator 2 (a complete resonance frequency and a proximity resonance frequency, mentioned later) to the driving frequency setting section 12 so as to drive the piezoelectric actuator 2.

The low-speed countermeasure processing section 15 has a driving frequency switching section 151, a driving time setting section 152, a number-of-driving-times setting section 153 and the like. The driving frequency switching section 151 switches the driving frequency set in the driving frequency setting section 12 from the frequency as the default value at the time of the ordinary driving (driving frequency f2, mentioned later) into a driving frequency for eliminating the abnormal state, namely, a resonance frequency of the piezoelectric actuator 2 (complete resonance frequency f3) or a frequency proximity to the resonance frequency (proximity resonance frequency f3' or proximity resonance frequency f3"). f3'=f3+Δf (+Δf represents an increase in frequency which is slightly higher than the complete resonance frequency f3), and f3"=f3−Δf (−Δf represents a decrease in frequency which is slightly lower than the complete resonance frequency f3, but the absolute value of −Δf may be the same as or different from the absolute value of +Δf).

The driving time setting section 152 sets driving times for the normal direction driving and the opposite direction driving at the complete resonance frequency f3 or the proximity resonance frequency f3' or the driving frequency f3" in the low-speed countermeasure process. The number-of-driving-times setting section 153 sets number-of-times information about the number of repeating times such that how many times a predetermined operation is performed. For example, when predetermined reciprocating driving composed of the normal direction driving and the opposite direction driving of the slider section 22 with respect to the rod section 21 is one set, the number-of-times information about how many sets of the reciprocating driving is carried out is set. The number of times represented by the number-of-times information may be arbitrary number of times.

The display control section 16 controls display of predetermined information on the instruction display section 32. For example, the display control section 16 displays result information (message sentence), such as "driving system is defective" or "position sensor is defective" after the driving system operation check is made by the driving speed determining section 14 or the low-speed countermeasure processing section 15 in the driving system operation check, on the instruction display section 32.

Figure 3:
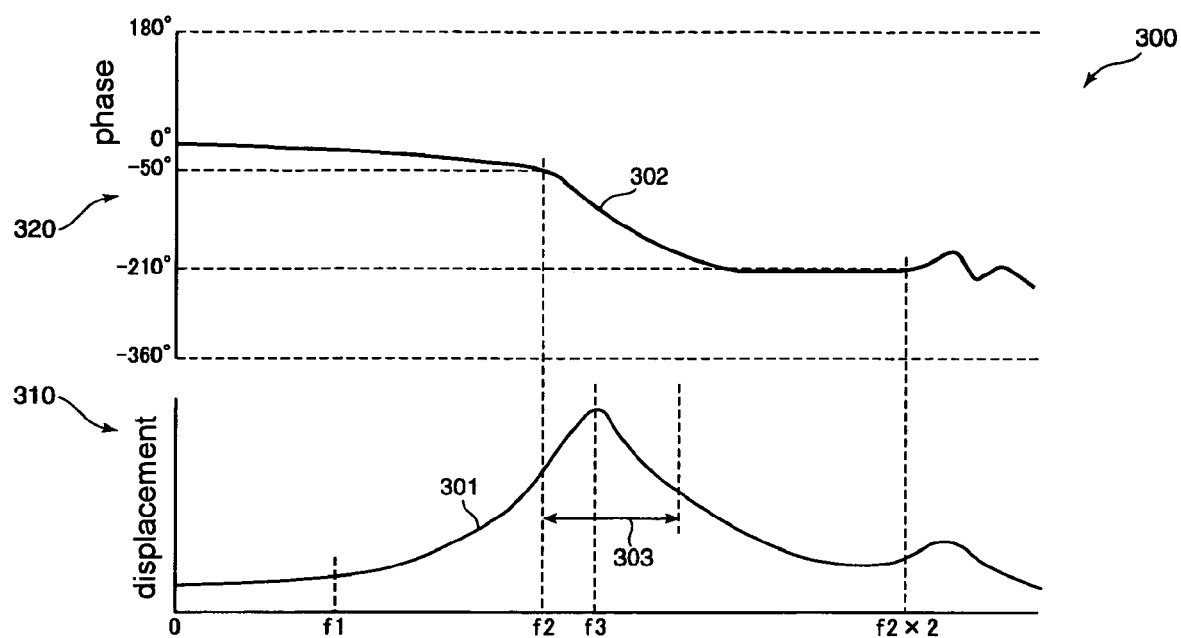
FIG. 3 is a frequency curve illustrating a relationship between a driving frequency of the actuator, and a phase and a displacement of a piezoelectric element section and a rod section forward end of the actuator.

With reference to FIG. 1, the explanation refers to that the piezoelectric actuator 2 is vibrated to be driven based on the driving signal (driving voltage; rectangular wave) from the driving section 33, but the vibration driving (driving principle) of the piezoelectric actuator 2 based on the driving signal is explained in detail below with reference to FIGS. 3 to 5. FIG. 3 is a frequency curve illustrating a relationship between the driving frequency of the piezoelectric actuator 2 and a phase and a displacement of the piezoelectric element section 23 and a forward end at the rod section 21 in the piezoelectric actuator 2.

In FIG. 3, a frequency curve 300 shows a graph chart (hereinafter, a displacement-frequency relationship diagram 310) illustrating one example of a relationship between the driving frequency (axis of abscissas) and the displacement (axis of ordinates) of the piezoelectric element section 23 and the forward end of the rod section 21, and a graph chart designated by reference numeral 320 (hereinafter, a phase-frequency relationship diagram 320) illustrating one example of a relationship between the driving frequency (axis of abscissas) and the displacement (axis of ordinates) of the forward end of the rod section 21. Curves represented by reference numerals 301 and 302 in the drawing are called as a displacement curve 301 and a phase curve 302, respectively.

In the displacement-frequency relationship diagram 310, the displacement curve 301 is approximately a spike curve such that, as the driving frequency gradually increases from zero, the displacement (vibration width) becomes larger, the position of the driving frequency f3 is a peak point (maximum displacement position), and thereafter the displacement becomes smaller. The driving frequency f3 represents so-called resonance frequency of the piezoelectric actuator 2. Since also the vicinity position of the driving frequency f3 is in a resonant state (resonance phenomenon occurs), however, the resonance frequency at the peak point is called as the complete resonance frequency, and the frequency which is proximity to the complete resonance frequency at which the resonance phenomenon occurs is called as the proximity resonance frequency. In FIG. 3, the driving frequency f2 represents a frequency to be used at the time of the ordinary driving (normal driving), and for example, it obtains a value which satisfies a relationship: f2=0.7×f3 and is lower than the complete resonance frequency f3. The driving frequency f2 is set to be about 0.7 time as high as the complete resonance frequency f3 in order to efficiently obtain a displacement which is equivalent to the case where a driving frequency other than the driving frequency f2 is used (saw-tooth displacement) with small voltage amplitude (the amplitude of rectangular waves 411 and 431 can be small), avoid the complete resonance frequency f3 at which possibility that the operation becomes unstable is high, and more stably control the driving at the driving frequency to be used at the time of the ordinary driving.

The driving frequency represented by "f2×2" on the axis of abscissas (driving frequency f2×2) represents a secondary sinusoidal frequency in the case where a primary sine wave included in the driving signal, mentioned later, is the driving frequency f2. The driving frequency f1 represents a frequency in an area where the piezoelectric actuator 2 is not in the resonant state (or an influence of resonance is less), and the displacement at the driving frequency f1 is small.

In the phase-frequency relationship diagram 320, as shown by the phase curve 302, the phase of the forward end of the rod section 21 is 0 (0°) when the driving frequency is 0, and as the driving frequency becomes higher, the phase shifts to a minus side. The phase, however, changes moderately in a zone where the driving frequency is 0 to f2 (here, the phase of the driving frequency f2 is −50°), and when the driving frequency exceeds f2 (for example, in a range represented by reference numeral 303 where the displacement at the complete resonance frequency f3 and at frequencies before and after f3 becomes large), the phase abruptly changes. The phase obtains an approximately constant value in a zone thereafter up to a driving frequency f2×2 (here, the phase at the driving frequency f2×2 is −210°), namely, the phase hardly changes, so that the flat graph is obtained.

Figure 4A:
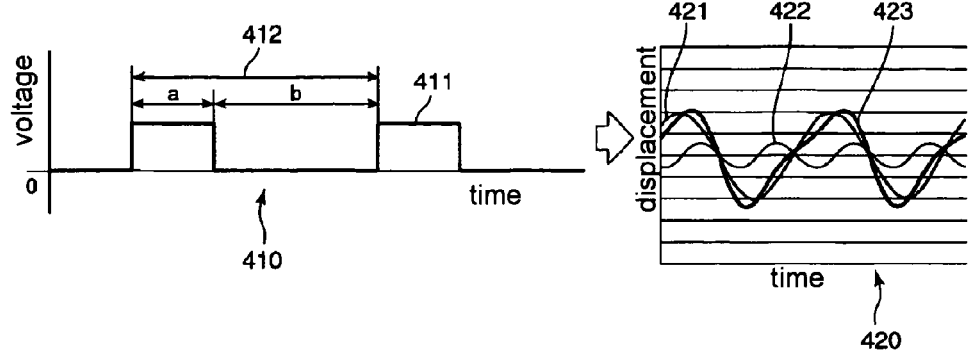
FIGS. 4A and 4B are conceptual diagrams for explaining driving voltage (driving signal) waveforms for the actuator and displacement waveforms of the piezoelectric element section and the rod section in the case where the actuator is driven by that driving voltage.
Figure 4B:
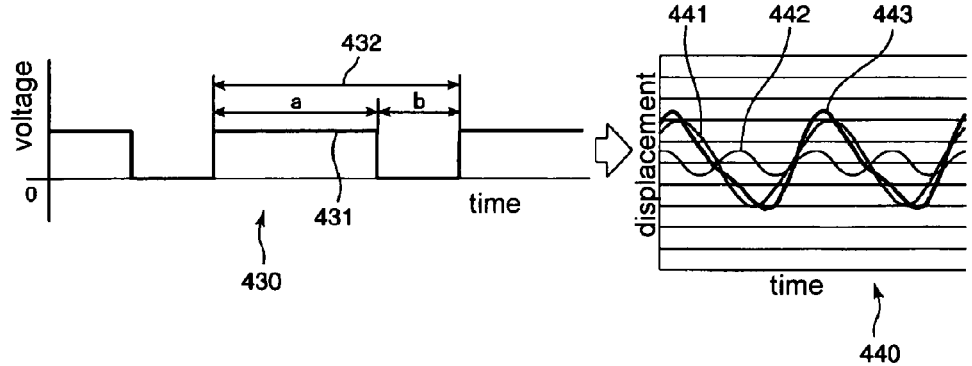

FIGS. 4A and 4B are conceptual diagrams for explaining the driving voltage (driving signal) waveform for the piezoelectric actuator 2 (in the explanation here, suitably, a rectangular wave) and a displacement waveform of the piezoelectric element section 23 and the rod section 21 in the case of the driving by means of the driving voltage. FIG. 4A is a diagram explaining the case where the normal direction driving is carried out, and FIG. 4B is a diagram explaining the case where the opposite direction driving is carried out. The left side of FIG. 4A shows a driving voltage waveform chart 410 where the driving voltage is applied to the piezoelectric element section 23 of the piezoelectric actuator 2 at the time of the normal direction driving, and the right side shows a displacement waveform chart 420 of the piezoelectric element section 23 and the rod section 21 (forward end) when the driving voltage is applied (similarly, FIG. 4B shows a driving voltage waveform chart 430 and a displacement waveform chart 440 at the time of the opposite direction driving).

When the rectangular wave 411 shown in the driving voltage waveform chart 410 is a rectangular wave corresponding to the driving frequency f2 at the time of the ordinary driving shown in FIG. 3, for example, the frequency corresponding to a period T (an inverse (1/T)) where a period represented by reference numeral 412 is designated by "T" is the driving frequency f2. Further, the rectangular wave 411 has a zone "a" where the voltage becomes high (H) for one period and a zone "b" where the voltage becomes low (L), and the duty ratio Dt is defined as a length ratio at the high and low periods, namely, Dt=a/(a+b). Hereinafter, the duty ratio having this definition is suitably expressed by duty ratio a:b. The rectangular wave 411 here shows the case where, for example, a:b=3:7, namely, the duty ratio 3:7 (Dt=0.3 (may be expressed as 30% in percentage)). Meanwhile, in the case of the rectangular wave 431 for the opposite direction driving shown in the driving voltage waveform chart 430 in FIG. 4B, the driving frequency is the driving frequency f2 which is the same as that of the rectangular wave 411 (period shown by reference numeral 432 is the period T), and thus, for example, a:b=7:3, namely, the duty ratio 7:3 (Dt=0.7 (70%)).

Not shown in FIGS. 4A and 4B, but rectangular waves which are obtained by inverting the rectangular waves 411 and 431 (correspond to the negative driving voltage −Vp) as well as the rectangular waves 411 and 431 (for example, correspond to the positive driving voltage +Vp) are applied to the piezoelectric element section 23 in order to charge and discharge the piezoelectric element section 23.

The rectangular wave 411 is constituted so that the primary (term), secondary, tertiary . . . sine waves are overlapped (synthesized), namely, the rectangular wave 411 is constituted so as to include the respective order sine waves (the respective order sine wave components composing the rectangular wave can be ensured by Fourier transformation or the like). The primary sine wave corresponds to the rectangular wave 411, namely, a frequency of the primary sine wave is a frequency of the rectangular wave 411 (here, the driving frequency f2), and accordingly a frequency of the secondary sine wave is the driving frequency f2×2 (see FIG. 3). When the rectangular wave 411 (driving voltage) is applied to the piezoelectric element section 23, according displacement of the piezoelectric element section 23 and the rod section 21 (forward end) is obtained. In other words, however, the piezoelectric actuator 2 has transfer function (voltage-displacement transfer function) such that when the rectangular wave is input, predetermined displacement is output.

When the primary sine wave in the rectangular wave 411 is applied to the piezoelectric actuator 2 (piezoelectric element section 23), namely, the primary sine wave is multiplied by the transfer function, amplitude and phase of the obtained displacement waveform of the piezoelectric element section 23 and the rod section 21 do not much change from the amplitude and the phase of the primary sine wave. When the secondary sine wave is multiplied by the transfer function similarly, the amplitude does not much change, but the phase is delayed (as shown in FIG. 3, because the driving frequency f2 and the driving frequency f2×2 corresponding to the primary and secondary sine waves are in a position where they sandwich the complete resonance frequency f3, their phases shift). When high-order sine waves after the tertiary are multiplied by the transfer function, the amplitude notably reduces, and this case does not influence a displacement waveform to be obtained. For this reason, the primary and secondary sine waves are treated as the sine wave components for obtaining the displacement waveform of the piezoelectric element section 23 and the rod section 21.

Concretely, when the amplitude of the rectangular wave 411 is, for example, "1", the amplitude of the respective order sine waves included in the rectangular wave 411 depends on the duty ratio, and a ratio in the amplitude of the primary sine wave to the secondary sine wave when Dt=0.3, for example, is about 1:0.6. When the piezoelectric actuator 2 is driven by the rectangular wave 411 including the primary and secondary sine waves, as shown in the displacement waveform chart 420, a displacement waveform 421 is obtained correspondingly to the primary sine wave, and a displacement waveform 422 is obtained correspondingly to the secondary sine wave. The amplitude ratio of the displacement waveforms 421 and 422 is about 1:0.3, and their phases are −50° and −210°, respectively (−210° is changed into −30° in the case of the opposite direction driving shown in the displacement waveform chart 440). For this reason, the displacement waveforms 421 and 422 obtained by the primary and secondary sine waves are synthesized so that a saw-tooth waveform 423 (triangular wave) which is a saw-tooth displacement waveform is obtained. In the case of FIG. 4B, similarly a displacement waveform 441 is obtained correspondingly to the primary sine wave in the rectangular wave 431, and a displacement waveform 442 is obtained correspondingly to the secondary sine wave. The displacement waveform 441 and 442 are synthesized so that a saw-tooth waveform 443 is obtained.

Figure 5:
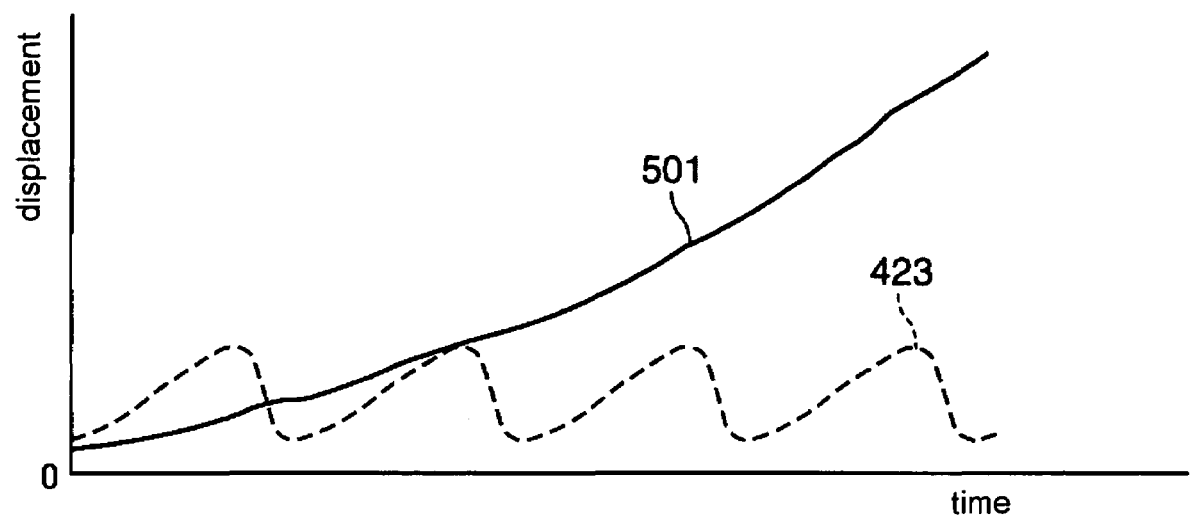
FIG. 5 is a diagram illustrating a state where a slider section moves in the case where vibration having a saw-tooth waveform is generated on the piezoelectric element section and the rod section.

As shown in FIG. 5 for example, when the rectangular wave 411 for the normal direction driving is applied to the piezoelectric actuator 2, vibration having the saw-tooth waveform 423 for the normal direction driving is generated on the piezoelectric element section 23 and the rod section 21, so that the slider section 22 which is friction-bonded to the rod section 21 can be moved to the normal direction by impact driving (for example, movement shown in displacement change designated by reference numeral 501). When the rectangular wave 431 is applied to the piezoelectric actuator 2, similarly vibration having the saw-tooth waveform 433 for the opposite direction driving is generated, so that the slider section 22 can be moved to the opposite direction by impact driving.

Figure 6:
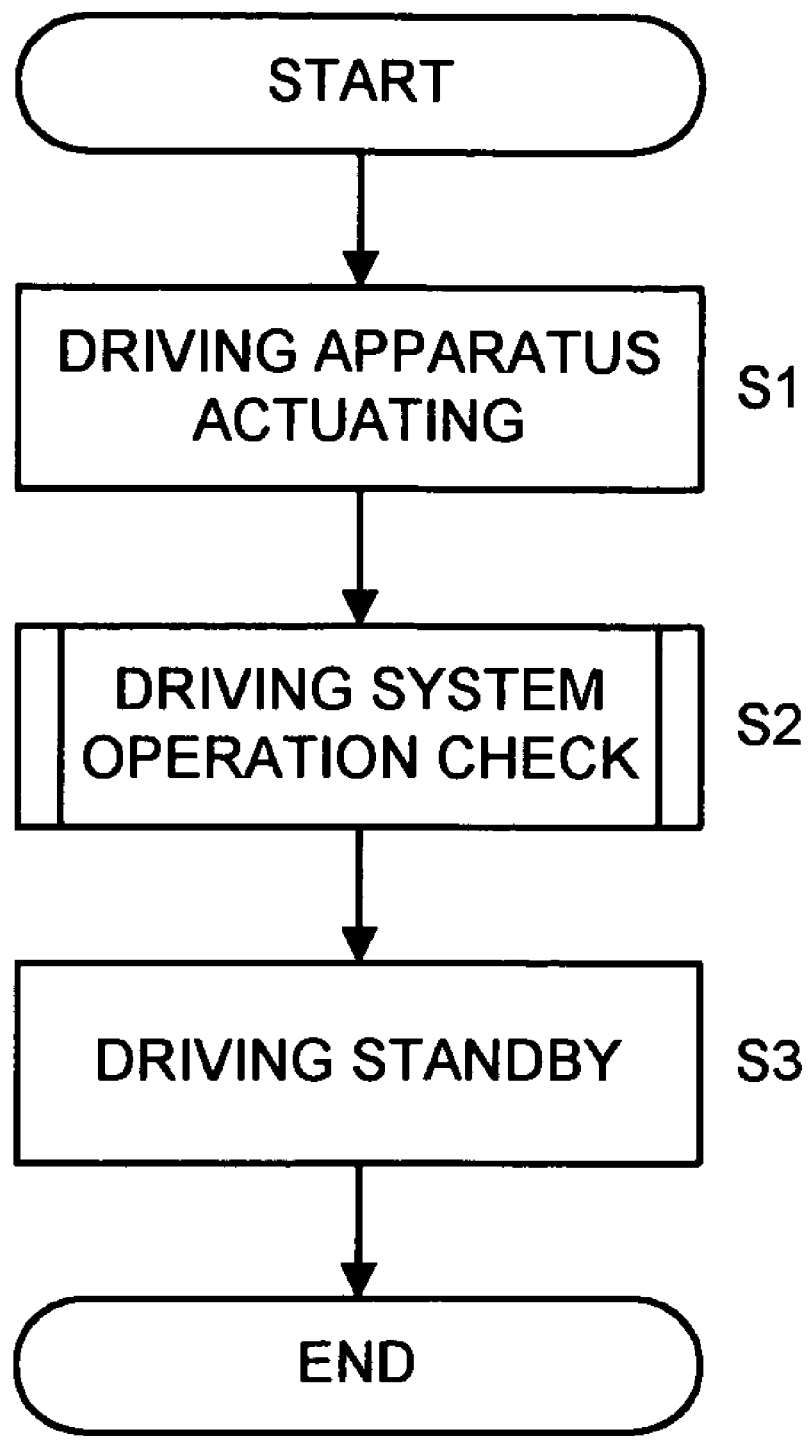
FIG. 6 is a flowchart illustrating one example of a whole operation of the piezoelectric driving apparatus according to an embodiment.

As to the operation of the piezoelectric driving apparatus 1 according to an embodiment having the above constitution, an entire flow is explained first. FIG. 6 is a flowchart illustrating one example of the entire operation of the piezoelectric driving apparatus 1 according to the embodiment. As shown in FIG. 6, when the operation is roughly sorted out, the operation is composed of the actuating step (step S1) of actuating the piezoelectric driving apparatus 1 according to a user's ON operation of the actuating switch, for example, the operation check step (step S2) of checking the operations of the driving systems (for example, the piezoelectric actuator 2 and the position detecting section 31) of the piezoelectric driving apparatus 1, and the driving standby step (step S3) of going to the driving standby state (waiting state) after the driving system operation check.

Details of the driving system operation check at step S2 shown in FIG. 6 are explained.

Figure 7:
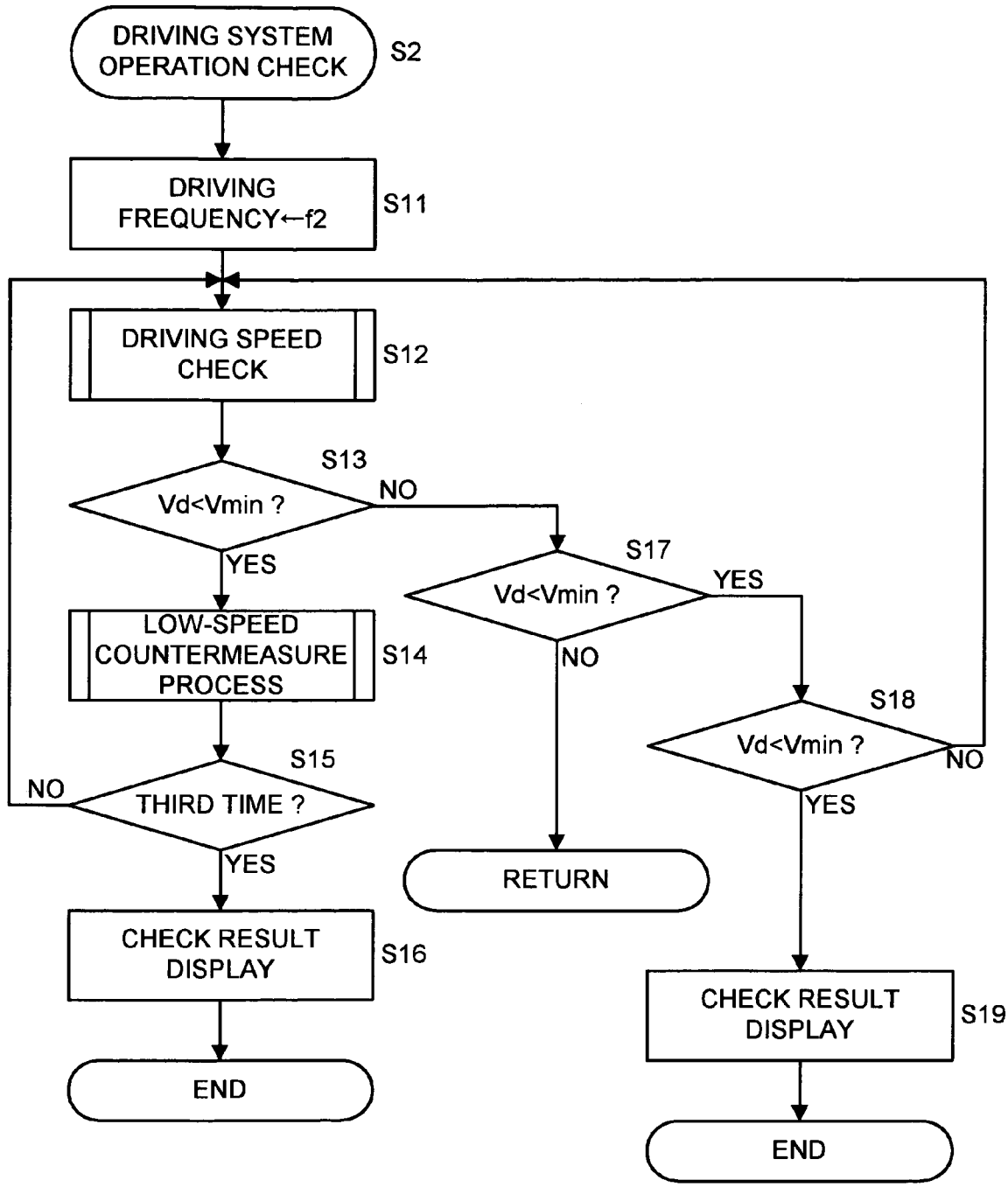
FIG. 7 is a flowchart illustrating one example of an operation at step S2 shown in FIG. 6.

FIG. 7 is a flowchart illustrating one example of the operation at step S2 shown in FIG. 6. The driving frequency f2 at the time of the ordinary driving is set in the driving frequency setting section 12 (step S11). The driving speed determining section 14 checks the driving speed of the piezoelectric actuator 2 (step S12). When the determination is made that the moving speed Vd of the slider section 22 with respect to the rod section 21 is lower than the minimum speed Vmin in the speed range (YES at step S13), the low-speed countermeasure processing section 15 executes the low-speed countermeasure process (step S14) in order to eliminate the state that the moving speed is low so as to return to the normal state (return to the speed value in the speed range). When the low-speed countermeasure process is the third time (YES at step S15), the result of the driving system operation check is displayed as a message sentence "operating system is defective" on the instruction display section 32 (monitor section) so that the user is informed of this (step S16). When the low-speed countermeasure process is not the third time (NO at step S15), the sequence returns to step S12, so that the driving speed is again checked. The number-of-times information at step S15 may be set in the number-of-driving-times setting section 153. Further, the number of times at step S15 may be an arbitrary number of times other than three times, namely, two times or five times, for example.

In the case where the determination is made at step S13 that the moving speed Vd of the slider section 22 is higher than the minimum speed Vmin in the speed range (NO at step S13), when the determination is further made that the moving speed Vd is higher than the maximum speed Vmax in the speed range (YES at step S17) and the determining operation at step S17 is the second time (YES at step S18), the result of the driving system operation check is displayed as a message sentence "position sensor is defective", which represents defect (abnormal) of the position detecting system, for example, on the instruction display section 32 (monitor section) so that the user is informed of it (step S19). When the determining operation at step S17 is not the second time (NO at step S18), the sequence returns to step S12, so that the driving speed is again checked. When the determination is made at step S17 that the moving speed Vd is not higher than the maximum speed Vmax in the speed range (NO at step S17), this case is determined as the normal driving state, and the sequence returns to the operation just after the step S2 in FIG. 6. When the piezoelectric actuator 2 is in the operation defective state or the operation disabled state, the low-speed countermeasure process at step S14 is executed. At that time, it cannot be said that the normal state is completely returned, but when once the abnormal state is eliminated, the stable driving operation can be performed thereafter.

The driving speed check operation at step S12 shown in FIG. 7 is explained in detailed below.

Figure 8:
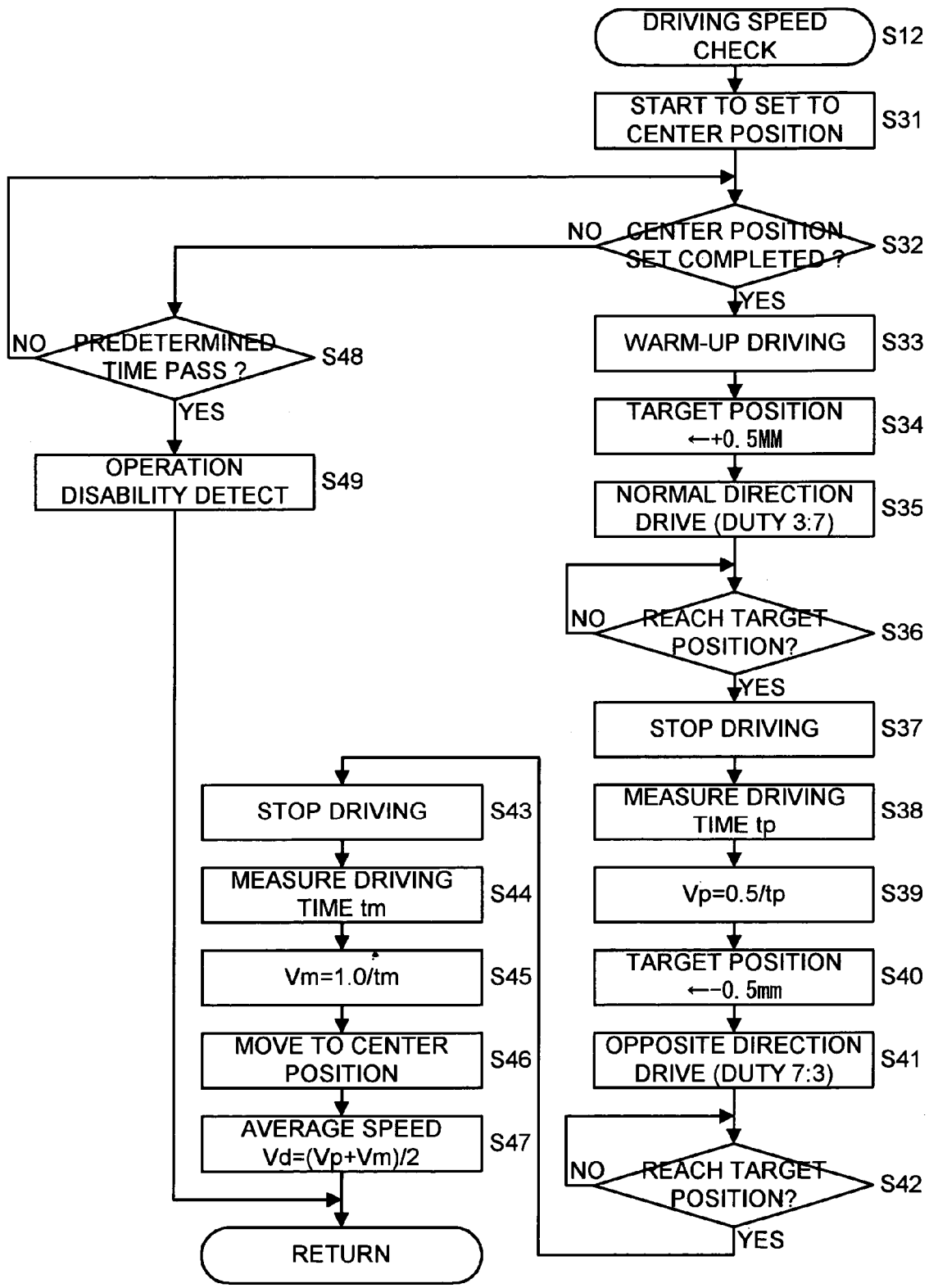
FIG. 8 is a flowchart illustrating one example of an operation at step S12 shown in FIG. 7.

FIG. 8 is a flowchart illustrating one example of the operation at step S12 shown in FIG. 7. The warm-up driving section 141 starts to set the slider section 22 to the center position of the rod section 21 (step S31). At this time, when the driving speed determining section 14 determines that the setting in the center position cannot be completed (executed) (NO at step S32) because the slider section 22 is fastened to the rod section 21 so that the slider section 22 cannot be moved with respect to the rod section 21 (the slider section 22 can be moved (vibrated) integrally with the rod section 21 with it being fastened to the rod section 21), the sequence waits until predetermined time passes (YES at step S48), and an operation disability detecting signal which represents that the slider section 22 cannot be moved is output to the low-speed countermeasure processing section 15 (step S49). Thereafter, the sequence returns to the operation just after step S12 in FIG. 7.

The determination is made that the setting in the center position is completed (YES at step S32), the warm-up driving section 141 carries out warm-up driving (step S33). After the warm-up driving is completed, the target position setting section 142 sets a target position in the positive direction (for example, +0.5 mm) with the center position being a standard point (step S34).

The piezoelectric actuator 2 is driven based on the duty ratio for the normal direction driving set in the duty setting section 13 (for example, 3:7) and the driving frequency f2 set at step S11 in FIG. 7 (step S35). The driving time measuring section 143 determines whether the slider section 22 reaches the target position in the normal direction, and when the determination is made that it reaches the target position (YES at step S36), the driving of the piezoelectric actuator 2 is stopped (step S37). When the determination is made that it does not reach the target position (NO at step S36), the driving is continued until the slider section 22 reaches the target position. The driving time measuring section 143 measures driving time tp until the slider section 22 in the center position reaches the target position in the normal direction (step S38), and the speed calculating section 144 calculates a moving speed Vp of the slider section 22 to the normal direction based on information about the target position (absolute value) in the normal direction set at step S34 and the driving time tp (for example, Vp=0.5/tp) (step S39).

The target position setting section 142 sets a target position in the opposite direction where the center position is used as the standard point (for example, −0.5 mm) (step S40). The piezoelectric actuator 2 is driven based on the duty ratio for the opposite direction driving set in the duty setting section 13 (for example, 7:3) and the driving frequency f2 set at step S11 in FIG. 7 (step S41). The driving time measuring section 143 determines whether the slider section 22 reaches the target position in the opposite direction, and when the determination is made that it reaches the target position (YES at step S42), the driving of the piezoelectric actuator 2 is stopped (step S43). When the determination is not made that slider section 22 reaches the target position (NO at step S42), the driving is continued until it reaches the target position. The driving time measuring section 143 measures driving time tm until the slider section 22 in the center position reaches the target position in the opposite direction (step S44), and the speed calculating section 144 calculates a moving speed Vm of the slider section 22 to the opposite direction based on information about a value, which is obtained by adding the target position (absolute value) in the opposite direction set at step S40 and the target value (absolute value) in the normal direction set at the step S34 (here, 0.1), and the driving time tm (for example, Vm=1.0/tm) (step S45).

While the moving speed Vm is being calculated or after the calculation, the piezoelectric actuator 2 is driven so that the warm-up driving section 141 returns the slider section 22 to the center position (step S46). After the moving speed Vm is calculated, an average speed Vd of the moving speeds Vm and the Vp is calculated based on information about the moving speed Vm and the moving speed Vp calculated at step S39 (for example, Vd=(Vp+Vm)/2) (step S47). Thereafter, the sequence returns to the operation just after step S12 in FIG. 7.

At step S32, the slider section 22 is actually fastened to the center position, but when the setting operation in the center position is determined as completed at the determining operation, the flow may be as follows. Similarly to steps S48 and S49, when the warm-up driving operation cannot be performed at the step of performing the warm-up driving operation at step S33 and a predetermined time passes, the operation disability detecting signal is output to the low-speed countermeasure processing section 15.

The low-speed countermeasure processing operation at step S14 in FIG. 7 is explained in detail below.

Figure 9:
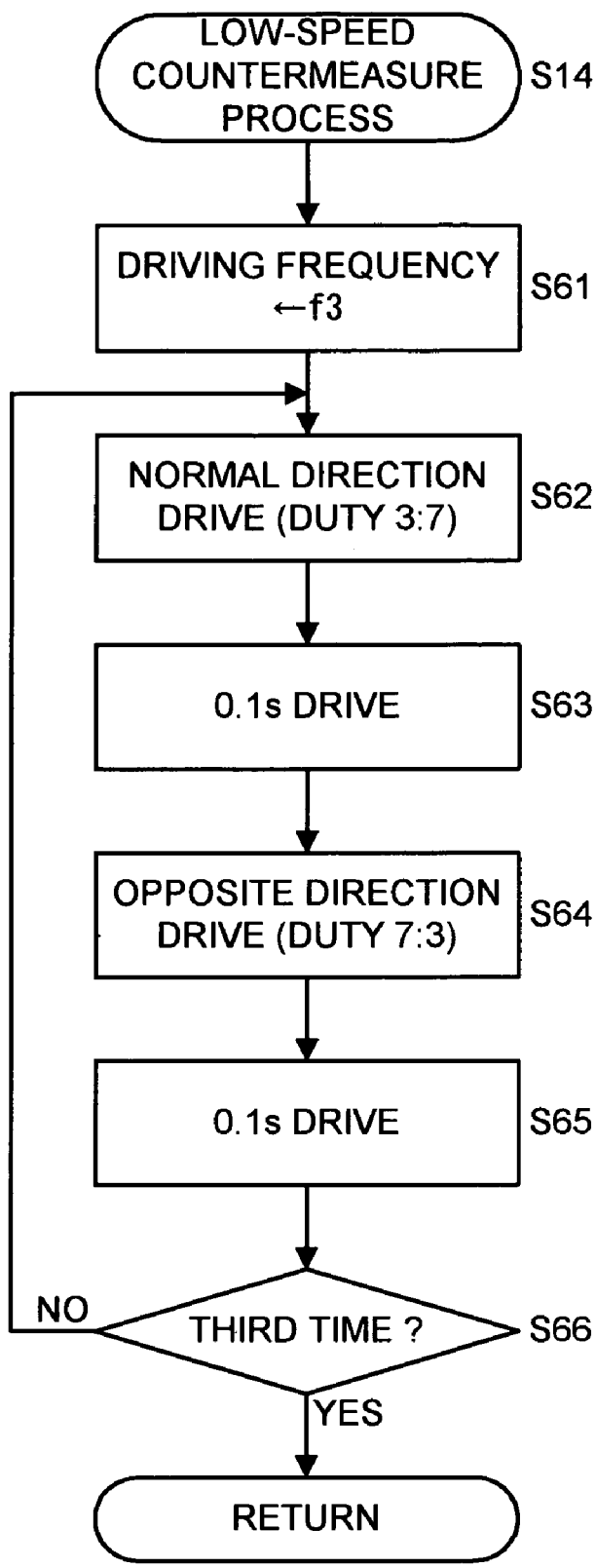
FIG. 9 is a flowchart illustrating one example of an operation at step S14 shown in FIG. 7.

FIG. 9 is a flowchart illustrating one example of the operation at step S14 shown in FIG. 7. At the low-speed countermeasure process, the driving frequency switching section 151 firstly switches the driving frequency set in the driving frequency setting section 12 from the current driving frequency f2 for the normal driving into the complete resonance frequency f3 and newly sets it (step S61). The normal direction driving duty ratio for the low-speed countermeasure process is set in the duty setting section 13 (step S62) (at step S62 in this embodiment, the duty ratio 3:7 as the default value which is already set in the duty setting section 13 is used), and the piezoelectric actuator 2 is driven for predetermined time (for example, 0.1 sec) based on the set duty ratio and the driving frequency f3 (step S63).

Similarly, the opposite direction driving duty ratio for the low-speed countermeasure process is set in the duty setting section 13 (step S64) (at step S64 in this embodiment, the duty ratio 7:3 as the default value which is already set in the duty setting section 13 is used), and the piezoelectric actuator 2 is driven for predetermined time (for example, 0.1 sec) based on the set duty ratio and the driving frequency f3 (step S65). When the driving operations to the normal and opposite directions at steps S62 to S65 compose one set, the low-speed countermeasure processing section 15 determines whether the one-set operation is the third time based on the information about the number of times set in the number-of-driving-times setting section 153, and when the determination is made that it is not the third time (NO at step S66), the sequence returns to step S62 so that a next set operation is performed. When the determination is made that the one-set operation is the third time (YES at step S66), the sequence returns to the operation just after step S14 in FIG. 7.

Figure 10:
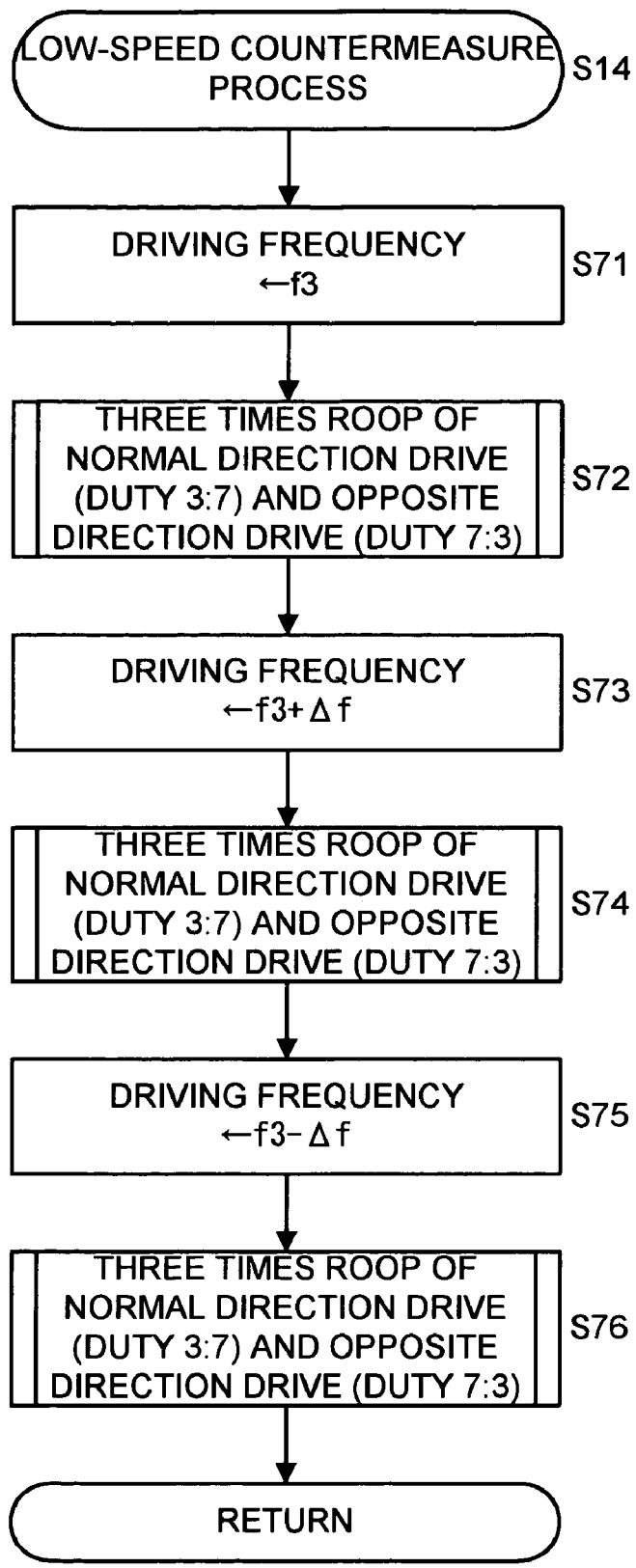
FIG. 10 is a flowchart illustrating a low-speed countermeasure processing operation at step S14 shown in FIG. 7 according to a modified embodiment.

The low-speed countermeasure processing operation may be performed according to a flow shown in FIG. 10.

FIG. 10 is a flowchart illustrating the low-speed countermeasure processing operation at step. S14 in FIG. 7 according to a modified embodiment. At the low-speed countermeasure process in this case, the driving frequency switching section 151 switches the driving frequency set in the driving frequency setting section 12 from the current driving frequency f2 for the ordinary driving into the complete resonance frequency f3 so as to newly set it (step S71). Similarly to the operation loop at steps S62 to S66 in FIG. 9, the normal direction driving (duty ratio 3:7) and the opposite direction driving (duty ratio 7:3) which are switched per predetermined time (0.1 sec) are carried out three times (step S72).

The driving frequency switching section 151 switches the driving frequency set in the driving frequency setting section 12 from the complete resonance frequency f3 into the proximity resonance frequency f3' so as to newly set it (step S73). Similarly to step S72, the normal direction driving (duty ratio 3:7) and the opposite direction driving (duty ratio 7:3) which are switched per predetermined time (0.1 sec) are carried out three times (step S74). At step S74, differently from the case of step S72, the piezoelectric actuator 2 is driven by the proximity resonance frequency f3'.

The driving frequency switching section 151 switches the driving frequency set in the driving frequency setting section 12 from the complete resonance frequency f3 into the proximity resonance frequency f3" so as to newly set it (step S75). Similarly to step S72, the normal direction driving (duty ratio 3:7) and the opposite direction driving (duty ratio 7:3) which are switched per predetermined time (0.1 sec) are carried out three times (step S76) by the proximity resonance frequency f3" as the driving frequency. Thereafter, the sequence returns to the operation just after step S14 in FIG. 7.

As shown in the flowchart of FIG. 10, besides f3, the driving frequency for the low-speed countermeasure process obtains values of f3+Δf and f3−Δf because of the following reason. The complete resonance point occasionally shifts due to the environmental change (deterioration with age) or the like, namely, a position of a peak point shown in the complete resonance frequency f3 in the displacement curve 301 of FIG. 3 occasionally moves by Δf, for example, from that position. For this reason, the driving at the driving frequency f3+Δf or f3−Δf can be carried out, and thus the possibility (probability) of eliminating the abnormal state (low-speed state) can be further improved.

Figure 11:
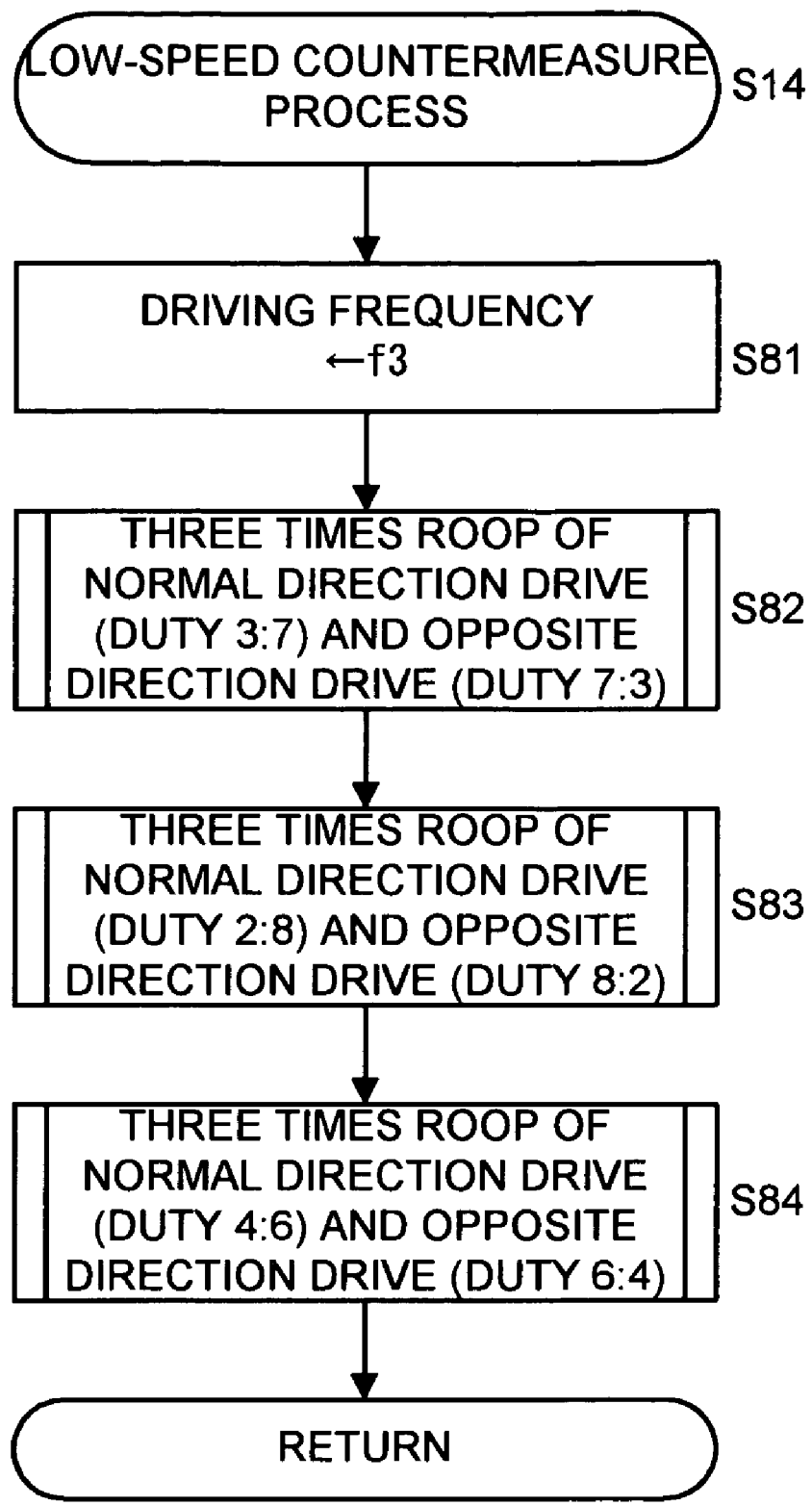
FIG. 11 is a flowchart illustrating the low-speed countermeasure processing operation at step S14 in FIG. 7 according to another modified example.

Further, the low-speed countermeasure processing operation may be performed according to a flow shown in FIG. 11.

FIG. 11 is a flowchart illustrating the low-speed countermeasure processing operation at step S14 shown in FIG. 7 according to another modified embodiment. At the low-speed countermeasure process in this case, the driving frequency switching section 151 switches the driving frequency set in the driving frequency setting section 12 from the current driving frequency f2 for the ordinary driving into the complete resonance frequency f3 so as to newly set it (step S81). Similarly to the operation loop at steps S62 to S66 in FIG. 9, the normal direction driving (duty ratio 3:7) and the opposite direction driving (duty ratio 7:3) which are switched per predetermined time (0.1 sec) are carried out three times (step S82).

In the state where driving frequency set in the driving frequency setting section 12 remains being the complete resonance frequency f3, duty ratios which are different from the duty ratios (3:7 and 7:3) for the normal direction and opposite direction driving at step S82 are used so that the driving operation which is similar to step S82 is performed. That is to say, the normal direction driving (for example, duty ratio 2:8) and the opposite direction driving (duty ratio 8:2) which are switched per predetermined time (0.1 sec) are carried out three times (step S83). The duty ratios (3:7 and 7:3) are changed into a different duty ratios (duty ratio switching instruction) in this embodiment by the low-speed countermeasure processing section 15, and the changed duty ratio is set in the duty setting section 13. Information about the duty ratio different from the duty ratios (3:7 and 7:3) may be stored in the duty setting section 13.

In the state where the driving frequency set in the driving frequency setting section 12 remains being the complete resonance frequency f3, duty ratios, which are different from the duty ratios (2:8 and 8:2) for the normal direction driving or the opposite direction driving at step S83, are used so that the driving operation which is similar to step S83 is performed. That is to say, the normal direction driving (for example, duty ratio 4:6) and the opposite direction driving (duty ratio 6:4) which are switched per predetermined time (0.1 sec) are carried out three times (step S84). Thereafter, the sequence returns to the operation just after S14 in FIG. 7.

As shown in the flowchart of FIG. 11, when duty ratios other than the duty ratio 2:8 (8:2), the duty ratio 4:6 (6:4) and the duty ratio 3:7 (7:3) are used as the duty ratios for the low-speed countermeasure process, the duty ratio 3:7 (7:3) is normally (basically) optimal for obtaining the maximum speed. Since, however, the duty ratio which is optimal for obtaining the maximum speed possibly changes due to environmental change or the like, when driving can be carried out by using duty ratios other than the duty ratio 3:7 (7:3), the possibility (probability) of eliminating the abnormal state (low-speed state) can be further improved.

According to the piezoelectric driving apparatus 1 of this embodiment, when the moving speed of the slider section 22 with respect to the rod section 21 is lower than a predetermined speed, the piezoelectric actuator 2 is driven by using the resonance frequency (complete resonance frequency f3) or the driving frequency to be the frequency proximity to the resonance frequency (f3±Δf) (even if the control at stable driving speed becomes difficult), so that a generative force of the actuator or an amount of displacement (amplitude) of the piezoelectric element section 23 (rod section 21) which is stronger or larger than those at the time of the ordinary driving (even if the slider section 22 is fastened to the rod section 21, a strong inertial force is generated in the slider section 22 which is vibrated together with the rod section 21 by the strong actuator generative force and the vibration having an amount of displacement in the rod section 21). As a result, since the slider section 22 can be moved against the strongly frictional state or the strongly fastened state that makes the moving speed small (zero), even if the piezoelectric actuator 2 is brought into the operation defective state or the operation disabled state, the abnormal state can be eliminated, namely, the operation defective state can be improved, or the operation disabled state can be eliminated easily and securely.

Since the frequency proximity to the complete resonance frequency f3 is a frequency which is higher than the complete resonance frequency f3 by a predetermined frequency (driving frequency f3+Δf) or a frequency which is lower by a predetermined frequency (driving frequency f3−Δf), (according to that there is a possibility that the position of the complete resonance point shifts from that of the complete resonance frequency f3 due to the environmental change or the like), not only the complete resonance frequency f3 but also the two driving frequencies f3+Δf and f3−Δf which are proximity to the complete resonance frequency f3 are used so that the operation defective state or the operation disabled state can be eliminated. As a result, the possibility (probability) of eliminating the abnormal state becomes higher than the case of using only the complete resonance frequency f3, and thus the abnormal state can be eliminated more securely.

Since the piezoelectric actuator 2 is driven by the driving section 33 based on the driving signal having plural kinds of duty ratios changed by the duty ratio changing unit (low-speed countermeasure processing section 15), (according to that there is a possibility that the optimal duty ratio for obtaining the maximum speed to be normally used, such as the duty ratio 3:7 (7:3), changes (shifts) to a different duty ratio due to the environmental change or the like), the operation defective state can be improved, or the operation disabled state can be eliminated by using the plural types of the driving frequencies with different duty ratios. As a result, a possibility (probability) of eliminating the abnormal state becomes higher than the case using the driving frequency using one duty ratio, and thus the abnormal state can be eliminated more securely.

The driving section 33 repeatedly carries out the reciprocating driving composed of the normal direction and opposite direction movements of the slider section 22 with respect to the rod section 21 based on the information about the number of the repeating times set in the number-of-driving-times setting section 153. For this reason, when the reciprocating driving is carried out plural times, namely, a plural sets (plural-time loops) of the operations at steps S62 to S65 shown in FIG. 9 composing one set (one loop) are carried out, the operation defective state can be improved, or the operation disabled state can be eliminated. As a result, the possibility (probability) of eliminating the abnormal state becomes higher than the case where the reciprocating driving is carried out only once, and thus the abnormal state can be eliminated more securely.

The driving speed determining section 14 determines whether the moving speed of the slider section 22 with respect to the rod section 21 is lower than the minimum speed Vmin in the predetermined speed range and is higher than the maximum speed Vmax in the predetermined speed range. For this reason, the operation can be checked for the operation defective state and the operation disabled state in the case where the moving speed is determined as being lower than the minimum speed Vmin, and the operation of the position detecting system for detecting the position of the slider section 22 to be used for detecting the moving speed of the slider section 22 can be checked, namely, a check can be made whether the position detecting section 31 (position detecting element section 311) is abnormal (defective). As a result, the operation check with higher accuracy can be made in the piezoelectric driving apparatus 1.

The present invention has the following forms.

(A) The operation check on the driving systems of the piezoelectric driving apparatus 1 does not have to be always made after actuation of the device unlike steps S1 and S2 in FIG. 6, and the operation check may be made in the case where, for example, the slider section 22 is brought into contact with an end position of the rod section 21 in the moving range so as to be in the operation disabled state.

(B) The duty ratio to be used at steps S35 and S41 in FIG. 8 does not have to be the duty ratio as the default value set in the duty setting section 13 (3:7 or 7:3), and a duty ratio which is arbitrarily set for the driving speed check may be used.

Similarly, at steps S62, S64, S72, S74, S76 and S82 shown in FIGS. 9, 10 and 11, a duty ratio which is set arbitrarily for the low-speed countermeasure process may be used.

(C) Unlike steps S34 and S40 in FIG. 8, the target position where the moving speed is detected does not have to be +0.5 mm in the normal direction and −0.5 mm in the opposite direction from the center position, and an arbitrary target position may be set. In this case, for example, the target position is set to +0.5 mm in the normal direction from the center position at step S34, and the center position (0 mm), namely, a position of the movement starting point is set at step S40, so that Vp and Vm may be calculated with the reciprocating distances being equal. Further, unlike at step S47, the average speed Vd of Vp and Vm does not have to be used as the final speed parameter for comparison with the predetermined speed range (minimum speed Vmin) at the driving speed check, and individual speed parameters such as Vp and Vm may be used.

(D) At the driving speed check operation shown in FIG. 8, the center position does not have to be always the standard point, namely, the slider section 22 does not have to be moved (set) to the center position first at the time of starting the driving speed check, and the check operation may be started by using an arbitrary position (for example, one end of the rod section 21 or a predetermined rest position of the slider section 22) as the standard point (movement starting position).

(E) In FIG. 9, one set of operations does not have to be composed of the repeated operation (driving) at steps S62 to S65, and one set may be composed of repeated operation constituted by arbitrarily combining the normal direction driving with the opposite direction driving such as driving for 0.1 sec to the normal direction, driving for 0.2 sec to the opposite direction and driving for 0.1 sec to the normal direction (the eliminating effect of the abnormal state can be heightened).

(F) The complete resonance frequency f3 does not have to be used as the driving frequency which is set at the first operation step (steps S61, S71 and S81 in FIGS. 9 to 11) in the low-speed countermeasure process, and the driving frequency f3+Δf or f3−Δf may be used.

(G) The low-speed countermeasure processing operation constituted by combining the flows in FIGS. 10 and 11 may be performed. In this case, for example, the operation at steps S83 and S84 in FIG. 11 may be performed after steps S72, S74 and/or S76 in FIG. 10, or the operation at steps S73 and S75 in FIG. 10 may be performed after the steps S82 and S83 in FIG. 11. With such combinations, the number of repeating times of the return operation increases, and thus the possibility of eliminating the abnormal state is further improved.

(H) Unlike the case of steps S82, S83 and S84 in FIG. 11, three types of duty ratios do not have to be used, for example, the other ratios such as two or five types of duty ratios may be used. Further, the duty ratios at steps S82 and S84 or at steps S83 and S84 are set to be the same values, so that different duty ratios do not have to be always used at all the steps.

(I) As the return operation for eliminating the abnormal state, the driving frequency in the above embodiment is changed into the complete resonance frequency f3 or the frequency proximity to it, the duty ratio is changed, or for example, the level of a voltage of the driving signal or an electric current to be applied to the piezoelectric actuator 2 (piezoelectric element section 23) (amplitude of rectangular wave) may be changed.

(J) The duty ratio Dt may be defined as Dt=b/(a+b).

(K) The piezoelectric driving apparatus 1 (piezoelectric actuator 2) of the present invention may be applied to, for example, a run-out correction driving (unit) that corrects run-out such as camera shake (analog camera, digital camera, video camera or the like). In this case, concretely, for example, an image pickup sensor such as CCD or CMOS is provided to the slider section 22, the piezoelectric actuator 2 is driven according to an amount of run-out (run-out direction) generated in the camera. The image pickup sensor as well as the slider section 22 is slid to be moved so that the run-out is corrected. Further, the piezoelectric driving apparatus 1 may be used not only for the run-out correction driving but also, for example, zoom driving, focusing driving and the like. Further, the piezoelectric driving apparatus 1 can be applied not only to cameras but also various devices including mobile phones and AV devices such as MD and DVD player.

As explained above, when the moving speed of the driven member is lower than the predetermined speed (when the speed is 0, namely, the driven member is fastened to the driving member so as to be incapable of moving), the piezoelectric actuator is driven by using the driving signal with complete resonance frequency or proximity resonance frequency. As a result, the actuator generative force or an amount of displacement (amplitude) which is stronger or larger than those at the time of the ordinary driving can be obtained. As a result, since the moving speed can overcome the high-friction state or the fastened state which makes the moving speed low, even when the piezoelectric actuator is in the operation defective state or the operation disabled state, the abnormal state can be eliminated, namely, the operation defective state can be improved, or the operation disabled state can be eliminated easily and secured.

When the above state is tried to be eliminated by using not only the complete resonance frequency but also the proximity resonance frequency, the possibility (probability) of eliminating the abnormal state becomes higher than the case of using only the complete resonance frequency, and thus the abnormal state can be eliminated more securely.

When the above state is tried to be eliminated by using plural types of driving frequencies with different duty ratios, the possibility (probability) of eliminating the abnormal state becomes higher than the case using the driving frequency with one type of duty ratio. As a result, the abnormal state can be eliminated more securely.

When the reciprocating driving composed of movements of the driven member to one direction and to the other direction with respect to the driving member is carried out plural times (when an operating unit of certain reciprocating driving is one set, plural sets of the operations are performed), the operation defective state can be improved, or the operation disabled state can be eliminated. As a result, the possibility (probability) of eliminating the abnormal state becomes higher than the case where the reciprocating driving is carried out only once, and thus the abnormal state can be eliminated more securely.

When the determination is made whether the moving speed of the driven member with respect to the driving member is higher than the maximum speed in a predetermined speed range, the operation of the position detecting system for detecting the position of the driven member to be used for detecting the moving speed of the driven member can be checked. As a result, the operation check with higher accuracy can be made in the device.

Although the present invention has been fully described by way of examples with reference to the accompanying drawings, it is to be noted that various changes and modifications will be apparent to those skilled in the art. therefore, unless such changes and modification depart from the scope of the present invention, they should be construed as being included therein.

What is claimed is:

1. A driving apparatus, comprising:
an actuator that includes an electro-mechanical transducer, a driving member which is fastened to the electro-mechanical transducer and displaces together with the transducer, and a driven member which is friction-bonded to the driving member, and is driven at a driving frequency;
a speed determining unit that determines whether a moving speed of the driven member with respect to the driving member is lower than a predetermined speed;
a frequency setting unit that, when the speed determining unit determines that the moving speed is lower than the predetermined speed, sets a frequency which can make the actuator generate a resonance phenomenon as the driving frequency for the actuator; and
a driving unit that, when the speed determining unit determines that the moving speed is lower than the predetermined speed, reciprocally drives the actuator using a driving signal with the frequency set by the frequency setting unit by applying a forward driving signal for driving the driven member in a normal direction followed by a backward driving signal for driving the driven member in an opposite direction.

2. A driving apparatus according to claim 1, wherein said frequency setting unit sets a complete resonance frequency where the displacement of the driving member is maximized.

3. A driving apparatus according to claim 1, wherein said frequency setting unit sets a proximity resonance frequency which is higher or lower than a complete resonance frequency where the displacement of the driving member is maximized.

4. A driving apparatus according to claim 1, wherein said driving unit sequentially performs the drive using a driving signal with a complete resonance frequency where the displacement of the driving member is maximized and the drive using a driving signal with a proximity resonance frequency which is higher or lower than the complete resonance frequency.

5. A driving apparatus according to claim 1, further comprising a duty ratio changing unit that changes a duty ratio, wherein said driving unit drives based on the driving signal having plural kinds of duty ratios changed by said duty ratio changing unit.

6. A driving apparatus according to claim 1, further comprising a time setting unit that sets a number-of-times information, wherein said driving unit repeats the reciprocating driving of the actuator the number-of-times set by the time setting unit.

7. A driving apparatus according to claim 1, wherein the predetermined speed is a minimum speed in a predetermined speed range, and said speed determining unit further determines whether a moving speed of the driven member with respect to the driving member is higher than a maximum speed in the predetermined speed range.

8. A driving apparatus according to claim 1, wherein said speed determining unit measures a time until the driven member reaches a target position.

9. A driving apparatus according to claim 1, wherein said driving member includes a rod, said driven member moves to a normal direction and an opposite direction in a reciprocating manner along the rod.

10. A driving apparatus according to claim 1, wherein the electro-mechanical transducer is a piezoelectric element.

11. A driving apparatus, comprising:
an actuator that includes an electro-mechanical transducer, a driving member which is fastened to the electro-mechanical transducer and displaces together with the transducer, and a driven member which is friction-bonded to the driving member, and is driven at a driving frequency; and
a driving signal generating circuit that determines whether a moving speed of the driven member with respect to the driving member is lower than a predetermined speed, sets a frequency which can make the actuator generate a resonance phenomenon as the driving frequency for the actuator when the moving speed is lower than the predetermined speed, and applies to the actuator a driving signal with the frequency to perform a reciprocating driving of the driven member by applying a forward driving signal for driving the driven member in a normal direction and applying a backward driving signal for driving the driven member in an opposite direction.

12. A driving apparatus according to claim 11, wherein said driving signal generating circuit sets a complete resonance frequency where the displacement of the driving member is maximized.

13. A driving apparatus according to claim 11, wherein said driving signal generating circuit sets a proximity resonance frequency which is higher or lower than a complete resonance frequency where the displacement of the driving member is maximized.

14. A driving apparatus according to claim 11, wherein said driving signal generating circuit sequentially performs the drive using a driving signal with a complete resonance frequency where the displacement of the driving member is maximized and the drive using a driving signal with a proximity resonance frequency which is higher or lower than the complete resonance frequency.

15. A driving apparatus according to claim 11, wherein said driving signal generating circuit changes a duty ratio of the driving signal.

16. A driving apparatus according to claim 11, wherein said driving signal generating circuit measures a time until the driven member reaches a target position.

17. A driving apparatus according to claim 11, wherein said driving member includes a rod, said driven member moves to a normal direction and an opposite direction in a reciprocating manner along the rod.

18. A driving apparatus according to claim 11, wherein the electro-mechanical transducer is a piezoelectric element.

19. A driving apparatus, comprising:
an actuator that includes a piezoelectric element, a rod which is fastened to the piezoelectric element and displaces together with the piezoelectric element, and a slider which is friction-bonded to the rod, and is driven at a driving frequency; and
a driving signal generating circuit that determines whether a moving speed of a driven member with respect to the driving member is lower than a predetermined speed, and when the determination is made that the moving speed is lower than the predetermined speed, sets a frequency which can make the actuator generate a resonance phenomenon as the driving frequency for the actuator, so as to reciprocally drive the actuator using a driving signal with the set frequency by applying a forward driving signal for driving the slider in a normal direction followed by a backward driving signal for driving the slider in an opposite direction.

20. A driving apparatus according to claim 19, wherein said driving signal generating circuit sets a complete resonance frequency where the displacement of the rod is maximized.

21. A driving apparatus according to claim 19, wherein said driving signal generating circuit sets a proximity resonance frequency which is higher or lower than a complete resonance frequency where the displacement of the rod is maximized.

22. A driving apparatus, comprising:
an actuator that includes an electro-mechanical transducer, a driving member which is fastened to the electro-mechanical transducer and displaces together with the transducer, and a driven member which is friction-bonded to the driving member, and is driven at a driving frequency; and
a driving signal generating circuit that determines whether a moving speed of the driven member with respect to the driving member is lower than a predetermined speed, sets a frequency which can make the actuator generate a resonance phenomenon as the driving frequency for the actuator when the moving speed is lower than the predetermined speed, and repeatedly applies to the actuator a driving signal with the frequency a plurality of times to solve an abnormal state, wherein the driving signal comprises a forward driving signal and a backward driving signal.

23. A driving apparatus according to claim 22, wherein said driving signal generating circuit sets a complete resonance frequency where the displacement of the driving member is maximized.

24. A driving apparatus according to claim 22, wherein said driving signal generating circuit sets a proximity resonance frequency which is higher or lower than a complete resonance frequency where the displacement of the driving member is maximized.

25. A driving apparatus according to claim 22, wherein said driving signal generating circuit changes a duty ratio of the driving signal.

26. A method of solving an abnormal state of an actuator that includes a driving member which is fastened to an electro-mechanical transducer to displace together with the transducer and a driven member which is friction-bonded to the driving member, comprising the steps of:
detecting an abnormal state of the actuator based on a speed of the driven member;
when the abnormal state is detected, setting a frequency which can make the actuator generate a resonance phenomenon as a driving frequency for the actuator when the abnormal state is detected;
when the abnormal state is detected, applying to the actuator a first driving signal with the set frequency to perform a normal direction drive; and
when the abnormal state is detected, applying to the actuator a second driving signal with the set frequency to perform an opposite direction drive after performing the normal direction drive.

27. A method according to claim 26, wherein a set of said first and second driving signals is repeatedly applied to the actuator a plurality of times.

28. A method of solving an abnormal state of an actuator that includes a driving member which is fastened to an electro-mechanical transducer to displace together with the transducer and a driven member which is friction-bonded to the driving member, comprising the steps of:
detecting an abnormal state of the actuator based on a speed of the driven member;
when the abnormal state is detected, setting a frequency which can make the actuator generate a resonance phenomenon as a driving frequency for the actuator when the abnormal state is detected; and
when the abnormal state is detected, repeatedly applying to the actuator a driving signal with the set frequency a plurality of times, wherein the driving signal comprises a forward driving signal and a backward driving signal.

29. A driving apparatus, comprising:
an actuator that includes an electro-mechanical transducer, a driving member which is fastened to the electro-mechanical transducer and displaces together with the transducer, and a driven member which is friction-bonded to the driving member;
a speed determining unit that determines whether a moving speed of the driven member with respect to the driving member is lower than a predetermined speed;
a frequency setting unit that sets a driving frequency to a selected frequency to set the moving speed to a selected speed greater than the predetermined speed and, when the speed determining unit determines that the moving speed is lower than the predetermined speed when the selected frequency is applied, performs a countermeasure process where the driving frequency is set to a resonance frequency of the actuator for a selected interval and returns the driving frequency to the selected frequency after the selected interval; and
a driving unit that drives the actuator using a driving signal with the driving frequency set by the frequency setting unit.

30. A driving apparatus according to claim 29, wherein said resonance frequency is a complete resonance frequency where the displacement of the driving member is maximized.

31. A driving apparatus according to claim 29, wherein said resonance frequency is a proximity resonance frequency that is higher or lower than a complete resonance frequency where the displacement of the driving member is maximized.

32. A driving apparatus according to claim 29, wherein said resonance frequency is at different times within the selected interval a complete resonance frequency where the displacement of the driving member is maximized and a proximity resonance frequency which is higher or lower than the complete resonance frequency.

33. A driving apparatus according to claim 29, further comprising a duty ratio changing unit that changes a duty ratio, wherein said driving unit drives based on the driving signal having plural kinds of duty ratios changed by said duty ratio changing unit.

34. A driving apparatus according to claim 29, further comprising a time setting unit that sets a number-of-times information, wherein said driving unit repeats the countermeasure process the number-of-times set by the time setting unit.

35. A driving apparatus according to claim 29, wherein the predetermined speed is a minimum speed in a predetermined speed range, and said speed determining unit further determines whether a moving speed of the driven member with respect to the driving member is higher than a maximum speed in the predetermined speed range.

36. A driving apparatus according to claim 29, wherein said speed determining unit measures a time until the driven member reaches a target position.

37. A driving apparatus according to claim 29, wherein said driving member includes a rod, said driven member moves to a normal direction and an opposite direction in a reciprocating manner along the rod.

38. A driving apparatus according to claim 29, wherein the electro-mechanical transducer is a piezoelectric element.

39. A driving apparatus, comprising:
an actuator that includes an electro-mechanical transducer, a driving member which is fastened to the electro-mechanical transducer and displaces together with the transducer, and a driven member which is friction-bonded to the driving member; and a driving signal generating circuit that sets a driving frequency of a driving signal applied to the actuator to a selected frequency to set a moving speed of the driven member to a selected speed and, if the moving speed of the driven member with respect to the driving member when the selected frequency is applied is lower than a predetermined speed that is less than the selected speed, performs a countermeasure process where the driving frequency is set to a resonance frequency of the actuator for a selected interval and returns the driving frequency to the selected frequency after the selected interval, wherein the driving signal during the selected interval is configured to provide at different times within the selected interval a forward driving signal for driving the driven member in a normal direction and a backward driving signal for driving the driven member in an opposite direction.

40. A driving apparatus according to claim 39, wherein the resonance frequency is a complete resonance frequency where the displacement of the driving member is maximized.

41. A driving apparatus according to claim 39, wherein the resonance frequency is a proximity resonance frequency which is higher or lower than a complete resonance frequency where the displacement of the driving member is maximized.

42. A driving apparatus according to claim 39, wherein said resonance frequency is at different times within the selected interval a complete resonance frequency where the displacement of the driving member is maximized and the drive using a driving signal with a proximity resonance frequency which is higher or lower than the complete resonance frequency.

43. A driving apparatus according to claim 39, wherein said driving signal generating circuit changes a duty ratio of the driving signal.

44. A driving apparatus according to claim 39, wherein said driving signal generating circuit measures a time until the driven member reaches a target position.

45. A driving apparatus according to claim 39, wherein said driving member includes a rod, said driven member moves to a normal direction and an opposite direction in a reciprocating manner along the rod.

46. A driving apparatus according to claim 39, wherein the electro-mechanical transducer is a piezoelectric element.

47. A driving apparatus, comprising:

an actuator that includes a piezoelectric element, a rod which is fastened to the piezoelectric element and displaces together with the piezoelectric element, and a slider which is friction-bonded to the rod, and is driven at a driving frequency; and a driving signal generating circuit that sets a driving frequency of a driving signal applied to the actuator to a selected frequency to set a moving speed of the driven member to a selected speed and, if the moving speed of a driven member with respect to the driving member when the selected frequency is applied is lower than a predetermined speed, and when the determination is made that the moving speed is lower than the predetermined speed that is less than the selected speed, performs a countermeasure process where the driving frequency is set to a resonance frequency of the actuator for a selected interval and returns the driving frequency to the selected frequency after the selected interval, wherein the driving signal during the selected interval is configured to provide within the selected interval a forward driving signal for driving the slider in a normal direction followed by a backward driving signal for driving the slider in an opposite direction.

48. A driving apparatus according to claim 47, wherein said resonance frequency is a complete resonance frequency where the displacement of the rod is maximized.

49. A driving apparatus according to claim 47, wherein said resonance frequency is a proximity resonance frequency which is higher or lower than a complete resonance frequency where the displacement of the rod is maximized.

50. A driving apparatus, comprising:

an actuator that includes an electro-mechanical transducer, a driving member which is fastened to the electro-mechanical transducer and displaces together with the transducer, and a driven member which is friction-bonded to the driving member, and is driven at a driving frequency; and a driving signal generating circuit that sets a driving frequency of a driving signal applied to the actuator to a selected frequency to set a moving speed of the driven member to a selected speed and, if the moving speed of the driven member with respect to the driving member when the selected frequency is applied is lower than a predetermined speed that is less than the selected speed, performs a countermeasure process where the driving frequency is set to a resonance frequency of the actuator for a plurality of selected intervals and returns the driving frequency to the selected frequency after each of the selected intervals, wherein the driving signal during the selected interval comprises a forward driving signal and a backward driving signal.

51. A driving apparatus according to claim 50, wherein said resonance frequency is a complete resonance frequency where the displacement of the driving member is maximized.

52. A driving apparatus according to claim 50, wherein said resonance frequency is a proximity resonance frequency which is higher or lower than a complete resonance frequency where the displacement of the driving member is maximized.

53. A driving apparatus according to claim 50, wherein said driving signal generating circuit changes a duty ratio of the driving signal.

54. A method of solving an abnormal state of an actuator that includes a driving member which is fastened to an electro-mechanical transducer to displace together with the transducer and a driven member which is friction-bonded to the driving member, comprising the steps of:

detecting an abnormal state of the actuator based on a speed of the driven member;

performing a countermeasure process where a driving frequency of a driving signal applied to the actuator is set to a resonance frequency of the actuator for a selected interval and returns the driving frequency to the selected frequency after the selected interval when the abnormal state is detected;

applying to the actuator a first driving signal with the set frequency to perform a normal direction drive; and applying to the actuator a second driving signal with the set frequency to perform an opposite direction drive after performing the normal direction drive.

55. A method according to claim 54, wherein a set of said first and second driving signals is repeatedly applied to the actuator a plurality of times during the selected interval.

56. A method of solving an abnormal state of an actuator that includes a driving member which is fastened to an electro-mechanical transducer to displace together with the transducer and a driven member which is friction-bonded to the driving member, comprising the steps of:

detecting an abnormal state of the actuator based on a speed of the driven member;

performing a countermeasure process where a driving frequency of a driving signal applied to the actuator is set to a resonance frequency of the actuator for a selected interval and returns the driving frequency to the selected frequency after the selected interval when the abnormal state is detected; and repeatedly applying to the actuator a driving signal with the set frequency a plurality of times, wherein the driving signal comprises a forward driving signal and a backward driving signal.

57. A driving apparatus, comprising:

an actuator that includes an electro-mechanical transducer, a driving member which is fastened to the electro-mechanical transducer and displaces together with the transducer, and a driven member which is friction-bonded to the driving member, and is driven at a driving frequency;

a speed determining unit that determines an abnormal state by determining whether a moving speed of the driven member with respect to the driving member is lower than a predetermined speed;

a frequency setting unit that, when the speed determining unit determines the abnormal state, sets a frequency which can make the actuator generate a resonance phenomenon as the driving frequency for the actuator; and a driving unit that reciprocally drives the actuator forward using a forward driving signal for driving the driven member in a normal direction followed by a backward driving signal for driving the driven member in an opposite direction with the frequency set by the frequency setting unit to solve the abnormal state.

* * * * *